(12) United States Patent
Lim et al.

(10) Patent No.: US 10,984,790 B2
(45) Date of Patent: Apr. 20, 2021

(54) METHOD OF PROVIDING SERVICE BASED ON LOCATION OF SOUND SOURCE AND SPEECH RECOGNITION DEVICE THEREFOR

(71) Applicant: Samsung Electronics Co., Ltd., Suwon-si (KR)

(72) Inventors: Hyeon-Taek Lim, Yongin-si (KR);
Sang-Yoon Kim, Seoul (KR);
Kyung-Min Lee, Suwon-si (KR);
Chang-Woo Han, Seoul (KR);
Nam-Hoon Kim, Seongnam-si (KR);
Jong-Youb Ryu, Hwaseong-si (KR);
Chi-Youn Park, Suwon-si (KR);
Jae-Won Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 107 days.

(21) Appl. No.: 16/202,932

(22) Filed: Nov. 28, 2018

(65) Prior Publication Data
US 2019/0164552 A1   May 30, 2019

(30) Foreign Application Priority Data

Nov. 30, 2017 (KR) .......................... 10-2017-0163693

(51) Int. Cl.
| G10L 15/22 | (2006.01) |
| G10L 15/08 | (2006.01) |
| G10L 15/28 | (2013.01) |
| G01S 3/802 | (2006.01) |
| G06F 3/0488 | (2013.01) |

(Continued)

(52) U.S. Cl.
CPC .............. G10L 15/22 (2013.01); G01S 3/802 (2013.01); G06F 3/0488 (2013.01); G06F 3/167 (2013.01);
(Continued)

(58) Field of Classification Search
CPC ......... G10L 15/22; G10L 15/08; G10L 15/28; G10L 25/84; G10L 2015/088;
(Continued)

(56) References Cited

U.S. PATENT DOCUMENTS 9,093,070 B2   7/2015 Kim
9,870,775 B2   1/2018 Lee et al.
(Continued)

FOREIGN PATENT DOCUMENTS

JP   2014-153663 A   8/2014
KR  10-2011-0005937 A   1/2011
(Continued)

OTHER PUBLICATIONS

International Search Report dated Mar. 18, 2019, issued in International Patent Application No. PCT/KR2018/014888.
(Continued)

Primary Examiner — Thierry L Pham
(74) Attorney, Agent, or Firm — Jefferson IP Law, LLP

(57) ABSTRACT

A speech recognition device is provided. The speech recognition device includes at least one microphone configured to receive a sound signal from a first sound source, and at least one processor configured to determine a direction of the first sound source based on the sound signal, determine whether the direction of the first sound source is in a registered direction, and based on whether the direction of the first sound source is in the registered direction, recognize a speech from the sound signal regardless of whether the sound signal comprises a wake-up keyword.

21 Claims, 31 Drawing Sheets

(51) Int. Cl.
   *G06F 3/16* (2006.01)
   *G10L 25/84* (2013.01)

(52) U.S. Cl.
   CPC .............. *G10L 15/08* (2013.01); *G10L 15/28* (2013.01); *G06F 2203/0381* (2013.01); *G10L 25/84* (2013.01); *G10L 2015/088* (2013.01); *G10L 2015/223* (2013.01); *G10L 2015/227* (2013.01)

(58) Field of Classification Search
   CPC ......... G10L 2015/223; G10L 2015/227; G06F 3/167; G06F 3/0488; G06F 2203/0381; G01S 3/802; G01S 3/801; G01S 5/28; G01S 3/8006; G01S 3/8055; G01S 5/22
   USPC ........................................................ 704/275
   See application file for complete search history.

(56) References Cited

U.S. PATENT DOCUMENTS

| | | |
|---|---|---|
| 2005/0234710 A1 | 10/2005 | Falcon et al. |
| 2009/0018828 A1* | 1/2009 | Nakadai ............... G10L 21/028 704/234 |
| 2013/0287237 A1* | 10/2013 | Aubreville ............ H04R 25/40 381/313 |
| 2015/0006176 A1* | 1/2015 | Pogue .................... G10L 15/22 704/249 |
| 2015/0331490 A1 | 11/2015 | Yamada |
| 2016/0189716 A1 | 6/2016 | Lindahl |
| 2016/0217789 A1 | 7/2016 | Lee et al. |
| 2017/0125037 A1 | 5/2017 | Shin |
| 2017/0330563 A1 | 11/2017 | Daley et al. |

FOREIGN PATENT DOCUMENTS

| | | |
|---|---|---|
| KR | 10-2013-0122839 A | 11/2013 |
| KR | 10-2016-0091725 A | 8/2016 |
| KR | 10-2017-0050908 A | 5/2017 |
| WO | 2014/210392 A2 | 12/2014 |

OTHER PUBLICATIONS

Extended European Search Report dated Aug. 21, 2020, issued in European Patent Application No. 18882512.9.

* cited by examiner

FIG. 1
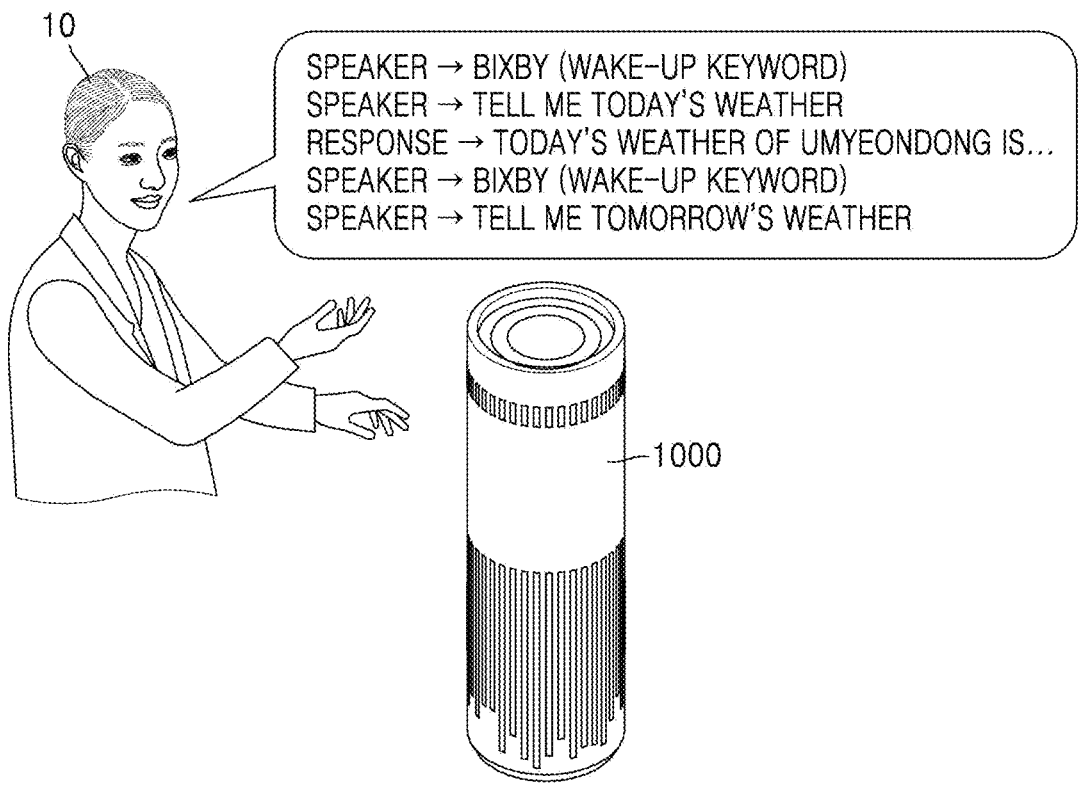
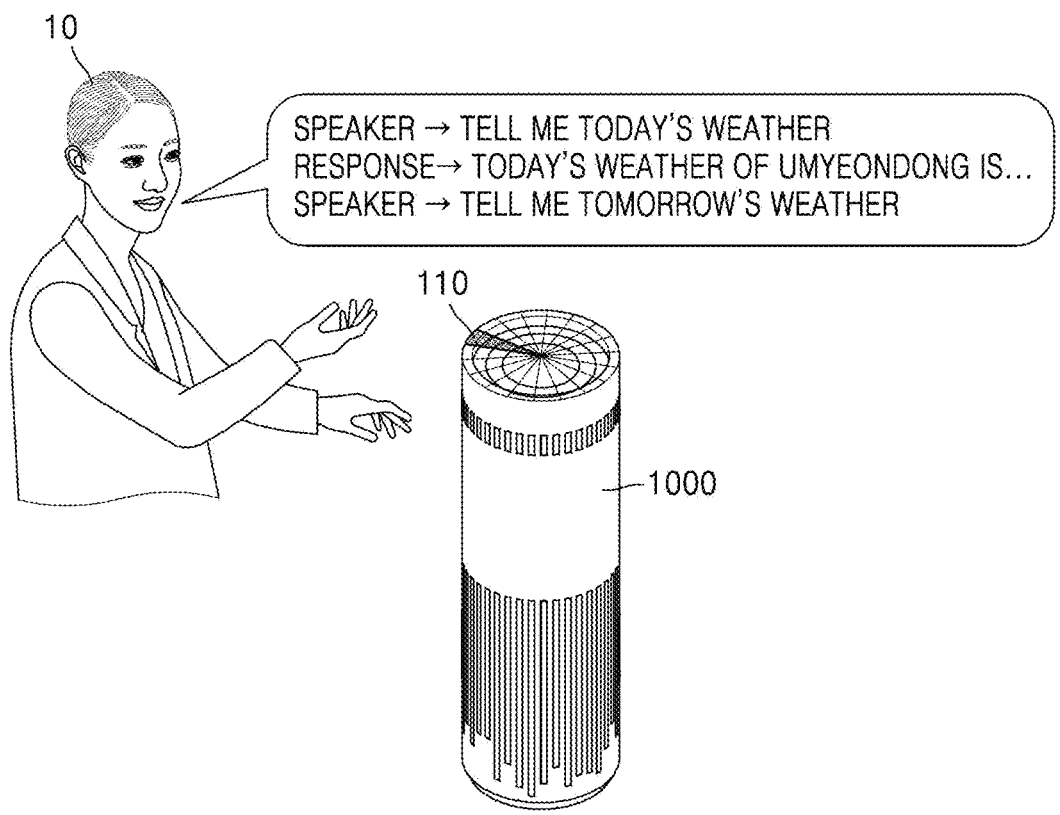

FIG. 11

| DIRECTION RANGE IDENTIFICATION INFORMATION | FIRST DIRECTION | SECOND DIRECTION | THIRD DIRECTION | FOURTH DIRECTION | FIFTH DIRECTION | SIXTH DIRECTION | SEVENTH DIRECTION | EIGHTH DIRECTION |
|---|---|---|---|---|---|---|---|---|
| ANGLE | 0 to 45 | 45 to 90 | 90 to 135 | 135 to 180 | −180 to −135 | −135 to −90 | −90 to −45 | −45 to −0 |
| SET DETAIL | — | — | REGISTERED DIRECTION | — | — | SHADING DIRECTION | — | — |

FIG. 14

| DIRECTION RANGE IDENTIFICATION INFORMATION | FIRST DIRECTION | SECOND DIRECTION | THIRD DIRECTION | FOURTH DIRECTION | FIFTH DIRECTION | SIXTH DIRECTION | SEVENTH DIRECTION | EIGHTH DIRECTION |
|---|---|---|---|---|---|---|---|---|
| ANGLE | 0 to 45 | 45 to 90 | 90 to 135 | 135 to 180 | −180 to −135 | −135 to −90 | −90 to −45 | −45 to −0 |
| 0 AM TO 7 AM | – | – | REGISTERED DIRECTION | – | – | SHADING DIRECTION | – | – |
| 7 AM TO 9 AM | – | SHADING DIRECTION | – | – | – | – | – | SHADING DIRECTION |
| 9 AM TO 12 PM | – | – | REGISTERED DIRECTION | – | – | SHADING DIRECTION | – | – |
| 12 PM TO 3 PM | – | – | REGISTERED DIRECTION | – | – | – | SHADING DIRECTION | – |
| ... | ... | ... | ... | ... | ... | ... | ... | ... |

FIG. 23

| DIRECTION RANGE IDENTIFICATION INFORMATION | FIRST DIRECTION | SECOND DIRECTION | THIRD DIRECTION | FOURTH DIRECTION | FIFTH DIRECTION | SIXTH DIRECTION | SEVENTH DIRECTION | EIGHTH DIRECTION |
|---|---|---|---|---|---|---|---|---|
| ANGLE | 0 to 45 | 45 to 90 | 90 to 135 | 135 to 180 | −180 to −135 | −135 to −90 | −90 to −45 | −45 to −0 |
| SET DETAIL | − | − | REGISTERED DIRECTION | − | − | SHADING DIRECTION | − | − |
| NEARBY DEVICE | TV | | REFRIGERATOR | | | WASHING MACHINE | | |
| LOCATION INFORMATION | − | | KITCHEN | | FRONT DOOR | | ROOM 1 | ROOM 2 |

METHOD OF PROVIDING SERVICE BASED ON LOCATION OF SOUND SOURCE AND SPEECH RECOGNITION DEVICE THEREFOR

CROSS-REFERENCE TO RELATED APPLICATION(S)

This application is based on and claims priority under 35 U.S.C. § 119(a) of a Korean patent application number 10-2017-0163693, filed on Nov. 30, 2017, in the Korean Intellectual Property Office, the disclosure of which is incorporated by reference herein in its entirety.

BACKGROUND

1. Field

The disclosure relates to a method and a speech recognition device for determining an intention of a user from a speech signal of the user and providing a service desired by the user.

2. Description of Related Art

An artificial intelligence (AI) system is a computer system that implements human-level intelligence. Unlike an existing rule-based smart system, the machine learns, determines, and becomes smart. Recognition efficiency and precision of understanding of a user's preference of an AI system are improved as the AI system is used more and more, and thus the existing rule-based smart systems are gradually being replaced by deep learning-based AI systems.

AI technologies include machine learning (deep learning) and element technologies that utilize the machine learning.

The machine learning is an algorithm technology for autonomously classifying/learning characteristics of input data. The element technologies are technologies that utilize machine learning algorithms like deep learning and include technological fields for linguistic understanding, visual understanding, reasoning/prediction, knowledge representation, motion control, etc.

Various fields in which an AI technique is applied are as follows. Linguistic understanding is a technique for recognizing, applying, and processing human languages/characters and includes natural language processing, machine translation, a dialogue system, a query response, speech recognition, and/or synthesis. Visual understanding is a technique for recognizing and processing objects in a manner similar to that of human vision and includes object recognition, object tracking, image searching, human recognition, scene understanding, space understanding, and image enhancement. Reasoning/prediction is a technique to determine information for logical reasoning and prediction and includes knowledge/probability-based reasoning, optimization prediction, preference-based planning, and recommendation. Knowledge representation is a technique for automating human experience information into knowledge data and includes knowledge building (data generation/categorization) and knowledge management (data utilization). Motion control is a technique for controlling autonomous driving of a vehicle and a motion of a robot and includes motion control (navigation, collision avoidance, driving), manipulation control (behavior control), etc.

From among them, the speech recognition is a rapidly developing field, and speech recognition devices for determining a user's intention from the user's speech signal and providing a service desired by the user are being commercialized. There is a need for a method of more conveniently using such a speech recognition device, and a technique for accurately determining an intention of a user is demanded.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for determining whether to provide a service based on a location of a sound source.

Another aspect of the disclosure is to provide a method and an apparatus for providing a service in consideration of a situation around a sound source.

Additional aspects will be set forth in part in the description which follows and, in part, will be apparent from the description, or may be learned by practice of the presented embodiments.

In accordance with an aspect of the disclosure, a speech recognition device is provided. The speech recognition device includes at least one microphone configured to receive a sound signal from a first sound source, and at least one processor configured to determine a direction of the first sound source based on the sound signal, determine whether the direction of the first sound source is in a registered direction, and based on whether the direction of the first sound source is in the registered direction, recognize a speech from the sound signal regardless of whether the sound signal includes a wake-up keyword.

Furthermore, the at least one microphone may be configured to receive a first speech signal output from a first user and a second speech signal output from a second sound source. The at least one processor may be further configured to determine whether a direction of the second sound source is in a shading direction. When the direction of the second sound source is in the shading direction, the second speech signal output from the second sound source may not be recognized.

Furthermore, based on a plurality of sound signals received from a plurality of directions, the at least one processor may be further configured to determine whether a noise signal is received in each of the plurality of directions and determine a direction in which noise signals are received for a reference amount of time or longer as a shading direction.

Furthermore, the at least one processor may be further configured to determine a time period during which noise signals are received for a reference amount of time or longer and may determine a direction in which noise signals are received as a shading direction in correspondence to the time period.

Furthermore, the speech recognition device may further include a storage configured to store identification information about a home device located in a registered direction in correspondence to the registered direction. As it is determined that a direction of the first user is in a registered direction, the at least one processor may be further configured to provide a speech recognition service to the first user based on the first speech signal received from the first user and the identification information of the home device corresponding to the registered direction.

Furthermore, the speech recognition device may further include a plurality of light-emitting devices configured to indicate a plurality of directions. The at least one processor may be further configured to control a light-emitting device corresponding to the registered direction from among the plurality of light-emitting devices to emit light differently from the remaining light-emitting devices of the plurality of light-emitting devices.

Furthermore, the speech recognition device may further include an interface including a plurality of touch elements corresponding to a plurality of directions. As a user input for touching a touch element corresponding to a first direction from among the plurality of touch elements is received, the at least one processor may be further configured to determine the first direction as the registered direction.

Furthermore, based on a plurality of sound signals received from a plurality of directions, the at least one processor may be further configured to determine a frequency that a wake-up keyword is received, respectively, in correspondence to the plurality of directions and determine a direction, which corresponds to a determined frequency equal to or higher than a critical value from among the plurality of directions, as the registered direction.

Furthermore, the at least one microphone may be further configured to receive a first speech signal output from a first user and a second speech signal output from a second user different from the first user, and when a priority corresponding to a direction to the first user is higher than a priority corresponding to a direction to the second user, the at least one processor may be further configured to recognize only the first speech signal output from the first user while excluding the second speech signal output from the second user.

Furthermore, a speech signal output from the first user may include a first speech signal and a second speech signal and, even when a direction of the second speech signal is not the registered direction, the at least one processor may be further configured to recognize the second speech signal regardless of whether the second speech signal includes a wake-up keyword, based on whether the direction of the second speech signal is within a critical angle from a direction of the first speech signal.

Furthermore, the at least one processor may be further configured to determine whether the direction of the first sound source is in a registered direction by determining whether the direction of the first sound source is within a critical angle from the registered direction.

Furthermore, the at least one processor may be further configured to determine a variation of the direction of the first sound source and determine whether the variation is within a critical angle to determine whether the direction of the first sound source is within the critical angle from the registered direction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a diagram showing a method by which a device provides a speech recognition service, according to an embodiment of the disclosure;

FIG. 11 is a diagram showing information about a registered direction and a shading direction stored in a device, according to an embodiment of the disclosure;

FIGS. 13A and 13B and FIG. 14 are diagrams showing methods by which a device sets a shading direction based on characteristics of received sound signals, according to various embodiments of the disclosure;

FIG. 23 is a diagram showing a method by which a device stores a home device or location information in correspondence to direction ranges, according to an embodiment of the disclosure;

Throughout the drawings, like reference numerals will be understood to refer to like parts, components, and structures.

DETAILED DESCRIPTION

Figure 2:
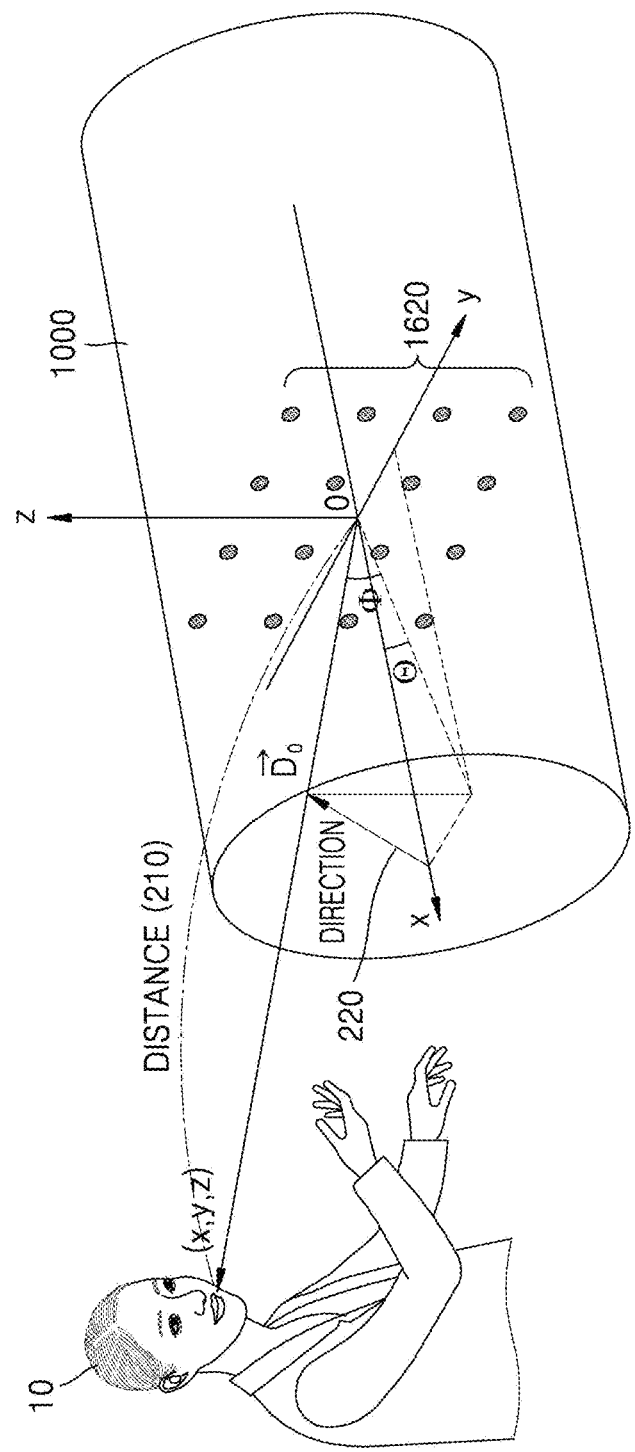
FIG. 2 is a diagram showing a method by which a device determines a location of a sound source, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. It is to be understood that the singular forms "a," "an," and "the" include plural referents unless the context clearly dictates otherwise. Thus, for example, reference to "a component surface" includes reference to one or more of such surfaces.

With respect to the terms in the various embodiments of the disclosure, the general terms which are currently and widely used are selected in consideration of functions of structural elements in the various embodiments of the disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the disclosure. Therefore, the terms used in the various embodiments of the disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Throughout the specification, a direction of a sound or a direction of speech may refer to a direction from a device to a sound source.

FIG. 1 is a diagram showing a method by which a device provides a speech recognition service, according to various embodiments of the disclosure.

Referring to FIG. 1, a device 1000 may determine whether a sound source 10 (e.g., a user) wants to receive a speech recognition service based on a wake-up keyword.

For example, when the sound source 10 says "Bixby, tell me today's weather" and "Bixby" is a wake-up keyword pre-set on the device 1000, the device 1000 may receive information about today's weather from an artificial intelligence (AI) server and provide the information to the sound source 10.

On the other hand, when the sound source 10 says "tell me today's weather" without the wake-up keyword "Bixby," since no wake-up keyword is received, the device 1000 may not provide any speech recognition service.

When it is determined whether the sound source 10 desires to receive a speech recognition service based on a wake-up keyword, there is an inconvenience that the sound source 10 needs to speak the wake-up keyword before requesting a speech recognition service to the device 1000.

Further, when a speech signal is received from a registered direction, the device 1000 may provide a speech recognition service based on the speech signal even when a wake-up keyword is not received.

For example, when the sound source 10 says "tell me today's weather," the device 1000 may determine a direction 110 of a received speech signal. A direction of a speech signal or a direction of a sound signal may refer to a direction from the device 1000 to a sound source. When the direction 110 of the received speech signal is in a registered direction, the device 1000 may transmit a sentence "tell me today's weather" to an AI server, receive information about today's weather, and provide the information to the user 10, even when no wake-up keyword is received.

Also, according to an embodiment, the device 1000 may determine a direction keyword corresponding to a registered direction as a wake-up keyword. For example, even when the direction 110 of the received speech signal is not in a registered direction and the received speech signal does not include a pre-set wake-up keyword, when the received speech signal includes a direction keyword corresponding to the registered direction, the device 1000 may provide a speech recognition service based on the received speech signal.

For example, the device 1000 may receive a user input that sets the zero degree as a registered direction. In this case, the device 1000 may output a sound signal indicating a direction keyword corresponding to the zero degree set as the registered direction. For example, when the device 1000 stores "zero degree" or "front" as the direction keyword indicating zero degree, the device 1000 may output a sound signal "zero degree or front is set as a registered direction."

Thereafter, when the device 1000 receives a speech signal "Front! Turn the television (TV) on," even when the direction of the speech signal is 90 degrees rather than the registered direction and the speech signal does not include the pre-set wake-up keyword "Bixby," the device 1000 may detect the direction keyword "front" and provide a speech recognition service based on the received speech signal.

FIG. 2 is a diagram showing a method by which the device 1000 determines the location of a sound source 10, according to various embodiments of the disclosure.

Referring to FIG. 2, the device 1000 may calculate a three-dimensional position of the sound source (e.g., the user 10) by using a plurality of microphones 1620.

For example, the device 1000 may select two pairs of microphones of different combinations of from among the plurality of microphones 1620 provided in the device 1000 and calculate time delays of speech signals in correspondence to the respective pairs of microphones. The device 1000 may calculate the three-dimensional location of the sound source 10 based on the calculated time delays and the locations of the plurality of microphones 1620. One of the most popular algorithms therefor is generalized cross-correlation with the phase transform (GCC-PHAT).

Further, the device 1000 may also receive sound signals by using the plurality of microphones 1620 and transform the sound signals to sound data in correspondence to each of the plurality of microphones 1620. Assuming that the received sound signal is received from a particular direction, the device 1000 may calculate a beam-forming power output by calculating a time delay for each of the plurality of microphones 1620, shifting sound data corresponding to each of the plurality of microphones 1620 by respective time delays corresponding thereto, and summing the shifted sound data. In this case, since the sum of the sound data is maximized when the assumed direction is the direction to the sound source 10, the device 1000 may calculate beam-forming power outputs for all possible directions and determined a direction corresponding to the largest beam-forming power output as the direction to the sound source 10. One of the most popular algorithms therefor is steered response power with the phase transform (SRP-PHAT).

Even when sound signals output from a plurality of sound sources are simultaneously received, the device 1000 is capable of determining the direction to each of the plurality of sound sources by using the SRP-PHAT algorithm. For example, when there are a plurality of directions corresponding to beam-forming power outputs equal to or greater than a critical value, it may be determined that a sound source exists in each of the plurality of directions corresponding to beam-forming power outputs equal to or greater than the critical value.

Also, even when sound signals output from the plurality of sound sources are simultaneously received, the device 1000 is capable of detecting a sound signal corresponding to each of the plurality of sound sources by using the SRP-PHAT algorithm. In other words, even when a sound signal output from a first sound source and a sound signal output from a second sound source are received simultaneously, the device 1000 is capable of not only detecting locations of the first sound source and the second sound source from the received sound signals, but also distinguishing the sound signal output by the first sound source and the sound signal output by the second sound source from each other.

Accordingly, the device 1000 is capable of determining the three-dimensional coordinates of the sound source 10 based on the locations of the plurality of microphones 1620 and, based on received sound signals, is capable of calculating a distance 210 to the source 10, an azimuth angle $\Theta$ of the sound source 10, and an altitude angle $\Phi$ of the sound source 10 with respect to the point of origin of three-dimensional coordinates. Also, when the three-dimensional location of the sound source 10 is projected onto a first plane (e.g., the z-y plane), the device 1000 may determine a direction 220 of the three-dimensional location of the sound source 10 projected onto the first plane.

In the below embodiments, the direction of the sound source 10 is described as the direction of a location projected onto one plane. However, according to embodiments, the direction of the sound source 10 may refer to a direction Do from the point of origin of three-dimensional coordinates toward the sound source 10.

Figure 3:
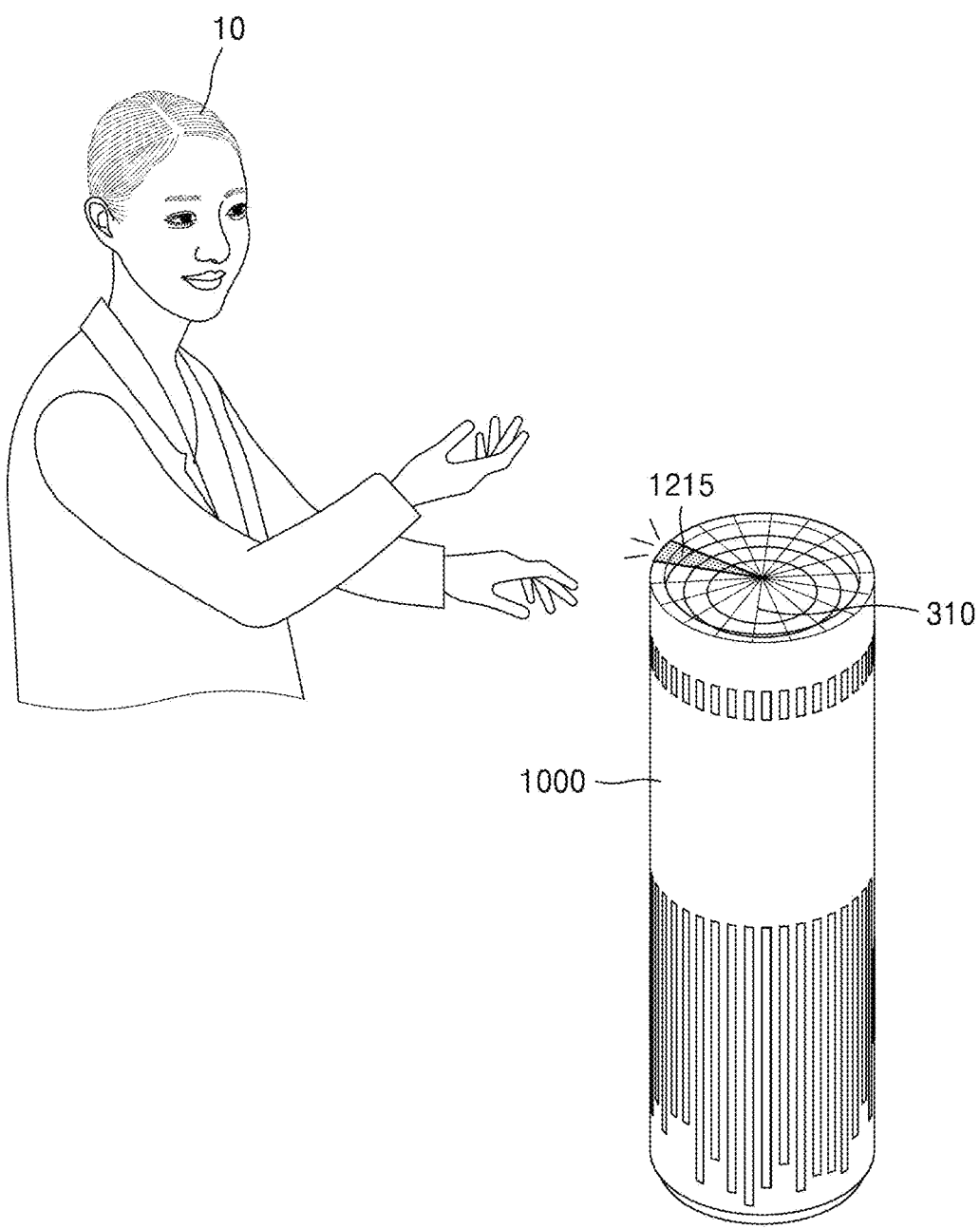
FIG. 3 is a diagram showing a method by which a device indicates the direction of a speech signal, according to an embodiment of the disclosure.

FIG. 3 is a diagram showing a method by which a device indicates the direction of a speech signal, according to embodiments of the disclosure.

Referring to FIG. 3, as the device 1000 receives a speech signal, the device 1000 may determine the direction of the received speech signal and indicate the determined direction.

The device 1000 may divide all directions into a plurality of direction ranges and determine angles corresponding to each direction range. For example, when a reference direction 310 is set to 0, the device 1000 may store a first direction range from 0 degree to 90 degrees, a second direction range from 90 degrees to 180 degrees, a third direction range from 180 degrees to 270 degrees, and a fourth direction range from 270 degrees to 360 degrees. The reference direction 310 may be pre-set in the device 1000.

The plurality of direction ranges may be pre-stored in the device 1000 during production of the device 1000 or may be set by a user. For example, the device 1000 may determine four direction ranges or twelve direction ranges as a user input for dividing the 360 degrees into four segments or twelve segments is received.

Furthermore, the device 1000 may include indicators that indicate a plurality of direction ranges. For example, a plurality of regions corresponding to a plurality of direction ranges may be expressed by displaying a plurality of lines intersecting one another at one center on an upper surface of the device 1000.

Furthermore, the device 1000 may include a plurality of light-emitting devices corresponding to a plurality of direction ranges. For example, the device 1000 may include a first light-emitting device 1215 in a region corresponding to a first direction range from among the plurality of regions. The plurality of light-emitting devices may include, but not limited to, a light-emitting diode (LED) or a display panel. Furthermore, a plurality of light-emitting devices may be arranged respectively in correspondence to a plurality of direction ranges, and may be configured as a touch screen by constituting a layer structure together with a touch pad.

The device 1000 may distinguish a light-emitting device corresponding to the direction of a speech signal from the other light-emitting devices and control the corresponding light-emitting device to emit light.

For example, the device 1000 may determine the direction of a received speech signal. As the direction of the received speech signal is determined, a direction range to which the direction of the received speech signal belongs from among a plurality of directional ranges may be determined. For example, when the direction of the received speech signal is 80 degrees, it may be determined that the received speech signal belongs to the first direction range indicating angles from zero degrees to 90 degrees. The device 1000 may indicate the direction of the received speech signal by blinking the first light-emitting device 1215 corresponding to the first direction range or by controlling the first light-emitting device to emit light distinctively from the remaining light-emitting devices.

The device 1000 may always indicate the direction of a received speech signal, regardless of whether the direction of the received speech signal is in a registered direction. Alternatively, according to embodiments, the device 1000 may indicate the direction of a received speech signal only when a speech signal is received from a registered direction. Furthermore, according to embodiments, the device 1000 may distinguish a case where the direction of a speech signal is in a registered direction and a case where the direction of a speech signal is not a registered direction from each other.

Figure 4:
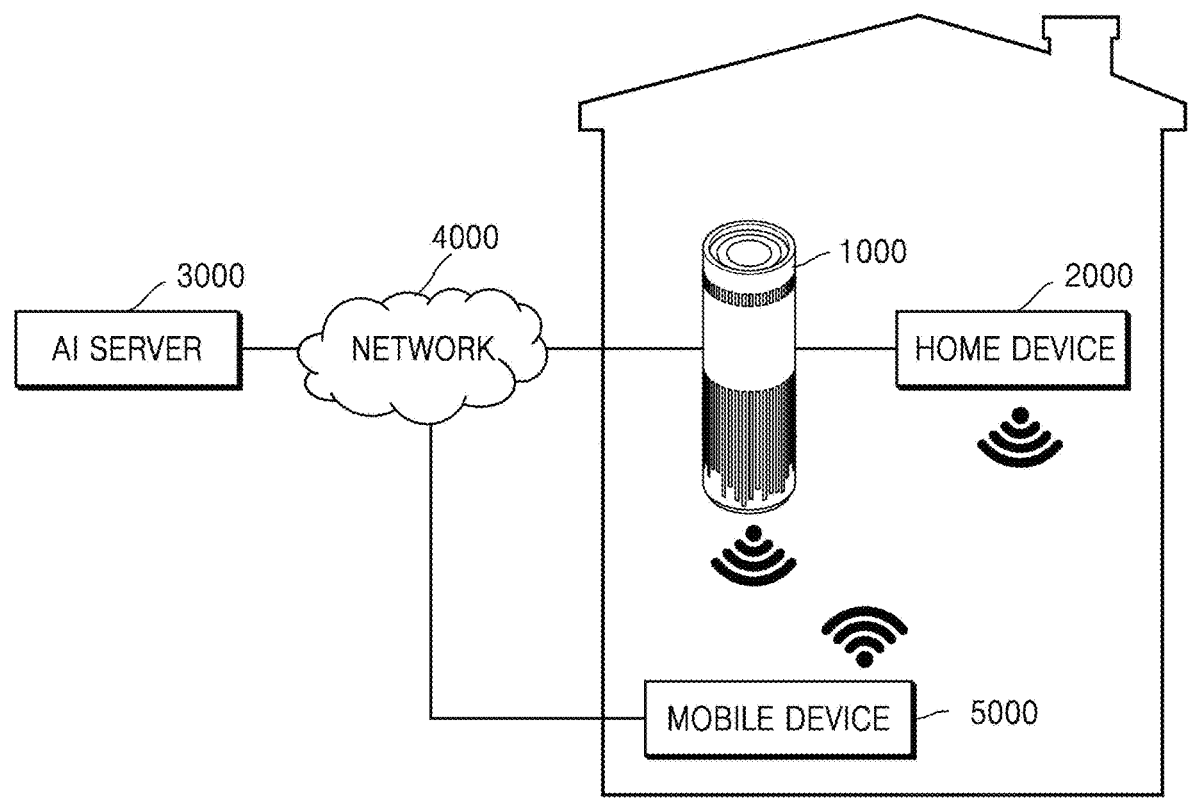
FIG. 4 is a diagram showing a method by which a device provides a speech recognition service in conjunction with an artificial intelligence (AI) server, according to an embodiment of the disclosure.

FIG. 4 is a diagram showing a method by which a device provides a speech recognition service in conjunction with an AI server, according to various embodiments of the disclosure.

Referring to FIG. 4, the device 1000 may provide a speech recognition service in conjunction with an AI server 3000.

The device 1000 may be connected to the AI server 3000 via a network 4000. The network 4000 may be a wireless network or a wired network. Also, the device 1000 may be connected to a mobile device 5000 via a short-range wireless network. A home device 2000 may also be connected to the mobile device 5000 via a short-range wireless network.

The speech recognition service may refer to an intelligent personal assistant or a speech-based intelligent service.

The speech recognition service may refer to providing services desired by a user according to a speech request of the user. Types of services may include an information providing service for providing information about a user's question, a personal management service like a user's schedule management, a user's social network management, and an e-mail management, and a device control service for controlling devices in a user's house, but are not limited thereto.

A process for determining a service desired by a user from a speech signal of the user includes a speech recognition process for detecting phonemes or words from the speech signal and a natural language processing process for determining a service desired by the user from detected phonemes or words via a morphological analysis, a syntax analysis, and a semantic analysis. Each of the above-stated processes may be performed by the AI server 3000 altogether or may be performed by the device 1000 and the AI server 3000 in a distributed fashion.

For example, when the device 1000 is a server-based speech recognition device, the device 1000 may transmit a received speech signal to the AI server 3000 as-is. The AI server 3000 may perform speech recognition and natural language processing on the received speech signal to detect words "today," "weather," and "tell me" from the received speech signal, determine that a service desired by a user is to provide information about today's weather, and provide information about today's weather to the device 1000.

Also, for example, when the device 1000 is an embedded speech recognition device capable of recognizing speech, the device 1000 may detect words "Bixby," "today," "weather," and "tell me" from a received speech signal and transmit the detected words to the AI server 3000 connected to the device 1000. The AI server 3000 may determine that the service desired by the user is to provide information about today's weather by performing a natural language processing on the received words and may provide information about today's weather to the device 1000.

Also, according to embodiments, the device 1000 may transmit an entire speech signal or detected phonemes or words to the AI server 3000 via the mobile device 5000, and the AI server 3000 may provide information to the device 1000 through the mobile device 5000 according to a determined speech recognition service.

A protocol for controlling the home device 2000 may be pre-set between the AI server 3000, the mobile device 5000, and the device 1000 and may include, for example, message identification information, device identification information, and control identification information. Accordingly, a request to turn a TV on may include identification information of the TV as the device identification information, identification information indicating turning on power as the control identification information, and identification information indicating that a corresponding control is performed by the home device 2000 as the message identification information. As a request is received to turn a TV on from the AI server 3000, the device 1000 may turn on a TV in a house. In this case, the device 1000 may operate as a home gateway.

Also, according the embodiments, the device 1000 may transmit a sentence "turn the TV on" to the AI server 3000 via the mobile device 5000. The mobile device 5000 may receive a request to turn the TV on from the AI server 3000 and may turn the TV on by controlling the TV that is connected to the mobile device 5000 via a short distance wireless connection.

The device 1000, the mobile device 5000, and the home device 2000 may include communication modules for communicating according to a wired communication technique or a wireless communication technique. For example, the device 1000, the mobile device 5000, and the home device 2000 may include a Wi-Fi module, a Zigbee module, a Bluetooth module, a near-field communication (NFC) module, a Z-WAVE module, and a wired communication module.

The device 1000 or the mobile device 5000 may store information about the home device 2000, may control the operation and the status of the home device 2000, and may collect necessary information from the home device 2000.

Home devices (e.g., home device 2000) may be configured to receive control commands from the device 1000 or the mobile device 5000 and transmit information obtained via sensors in the home devices to the device 1000 or the mobile device 5000.

The home devices may include smart appliances, security devices, lighting devices, energy devices, etc. located inside a house. For example, the smart appliances may include a refrigerator, a washing machine, and a robot cleaner, the security devices may include a door lock, a security camera, and a security sensor, the lighting devices may include a fluorescent lamp and an LED lighting device, and the energy devices may include a power meter, a power socket, an electrical outlet, or a multi-tap. Furthermore, the home devices may include a personal computer (PC), an internet protocol (IP) camera, an internet telephone, a wired/wireless telephone, and a mobile telephone in a house.

The device 1000, the mobile device 5000, or the AI server 3000 may store information about the direction of the device 1000 in correspondence to identification information of the device 1000 or identification information of a user.

Figure 5:
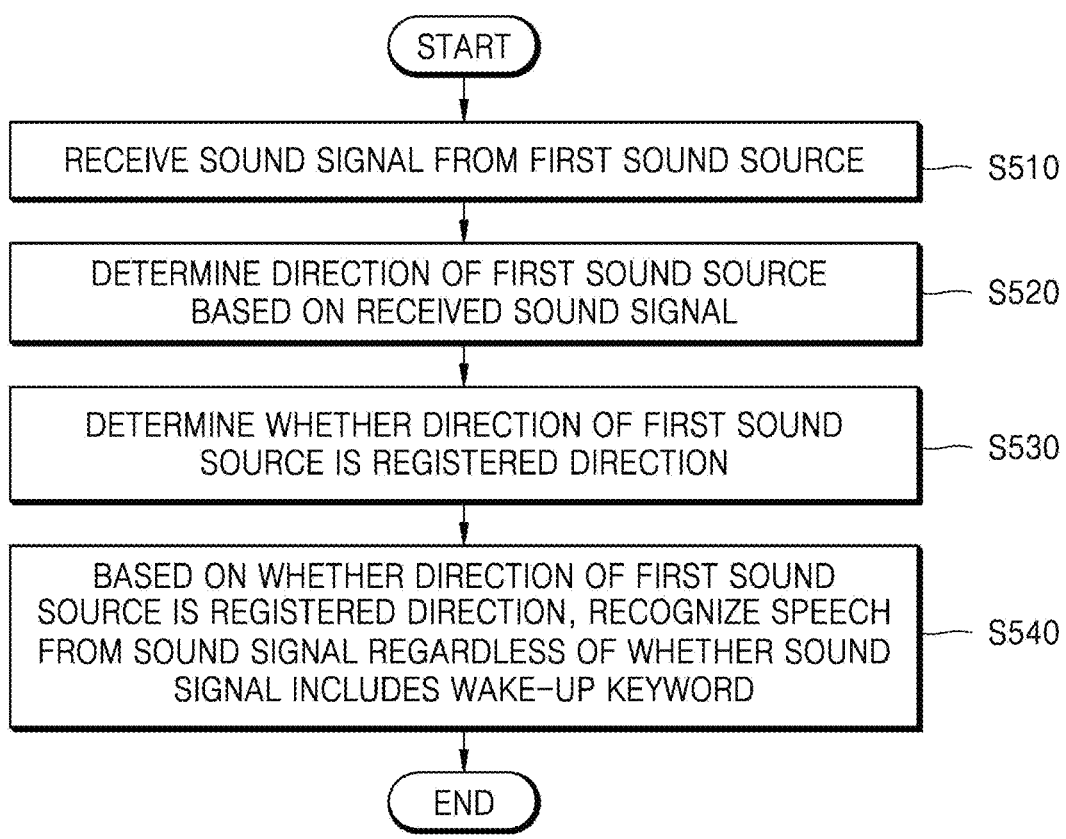
FIG. 5 is a flowchart of a method by which a device provides a speech recognition service based on a direction of sound, according to an embodiment of the disclosure.

FIG. 5 is a flowchart of a method by which a device provides a speech recognition service based on the direction of sound, according to various embodiments of the disclosure.

Referring to FIG. 5, in operation S510, the device 1000 may receive a sound signal from a first sound source.

In operation S520, the device 1000 may determine the direction from the device 1000 to the first sound source based on the received sound signal.

The device 1000 may determine the direction to the first sound source as an angle of the first sound source. For example, when a reference direction in the device 1000 is set to zero degrees, the device 1000 may calculate an angle from the reference direction to the direction to the first sound source.

In operation S530, the device 1000 may determine whether the direction to the first sound source is in a registered direction.

The registered direction may be pre-set in the device 1000 by a speech command of a user. The registered direction may also be pre-set in the device 1000 via a user input unit like a button or a touch sensor. The registered direction may be determined as a range of angles, e.g., a range of angles from 90 degrees to 100 degrees. The device 1000 may store a range of angles of the registered direction in correspondence to the identification information of the registered direction. The device 1000 may determine whether the direction to the first sound source is in a registered direction, based on whether the angle of the first sound source belongs to the range of angles of the registered direction.

In operation S540, the device 1000 may recognize a speech of a first user from a sound signal based on whether the direction to the first sound source is in a registered direction.

The device 1000 may be a speech recognition device that determines whether to recognize a speech of a user based on a wake-up keyword. The wake-up keyword may be at least one keyword for requesting to provide a speech recognition service based on a speech signal following the wake-up keyword. In other words, the device 1000 may determine whether a user desires to receive a speech recognition service based on a wake-up keyword. Accordingly, when a received sound signal includes a wake-up keyword, the device 1000 transmits a speech signal received after the wake-up keyword or words detected from the speech signal to an AI server and provide a service based on information received from the AI server.

According to embodiments, the wake-up keyword may be at least one of a human speech like "Bixby" and a non-speech sound like a handclapping sound. Furthermore, when the device 1000 performs an image recognition function, the wake-up keyword may include various types of gestures and lights. The wake-up keyword may also be changed by a user. For example, the device 1000 may store a word "brother" as the wake-up keyword when a speech input "set brother as the wake-up keyword" is received.

Even when the device 1000 is a server-based speech recognition device that does not perform speech recognition within the device 1000, the device 1000 may recognize a pre-set keyword. For example, the device 1000 may store features of a speech signal regarding a pre-set keyword and determine whether a received speech signal includes the stored features. When the received speech signal includes the stored features, the device 1000 may determine that the keyword is received.

Even when a wake-up keyword is not received, when the direction of a received speech signal is in a registered direction, the device 1000 may recognize a speech of a first user from the speech signal and provide a speech recognition service based on a recognized content. Accordingly, the user may be provided with a desired speech recognition service without saying a wake-up keyword every time.

Figure 6:
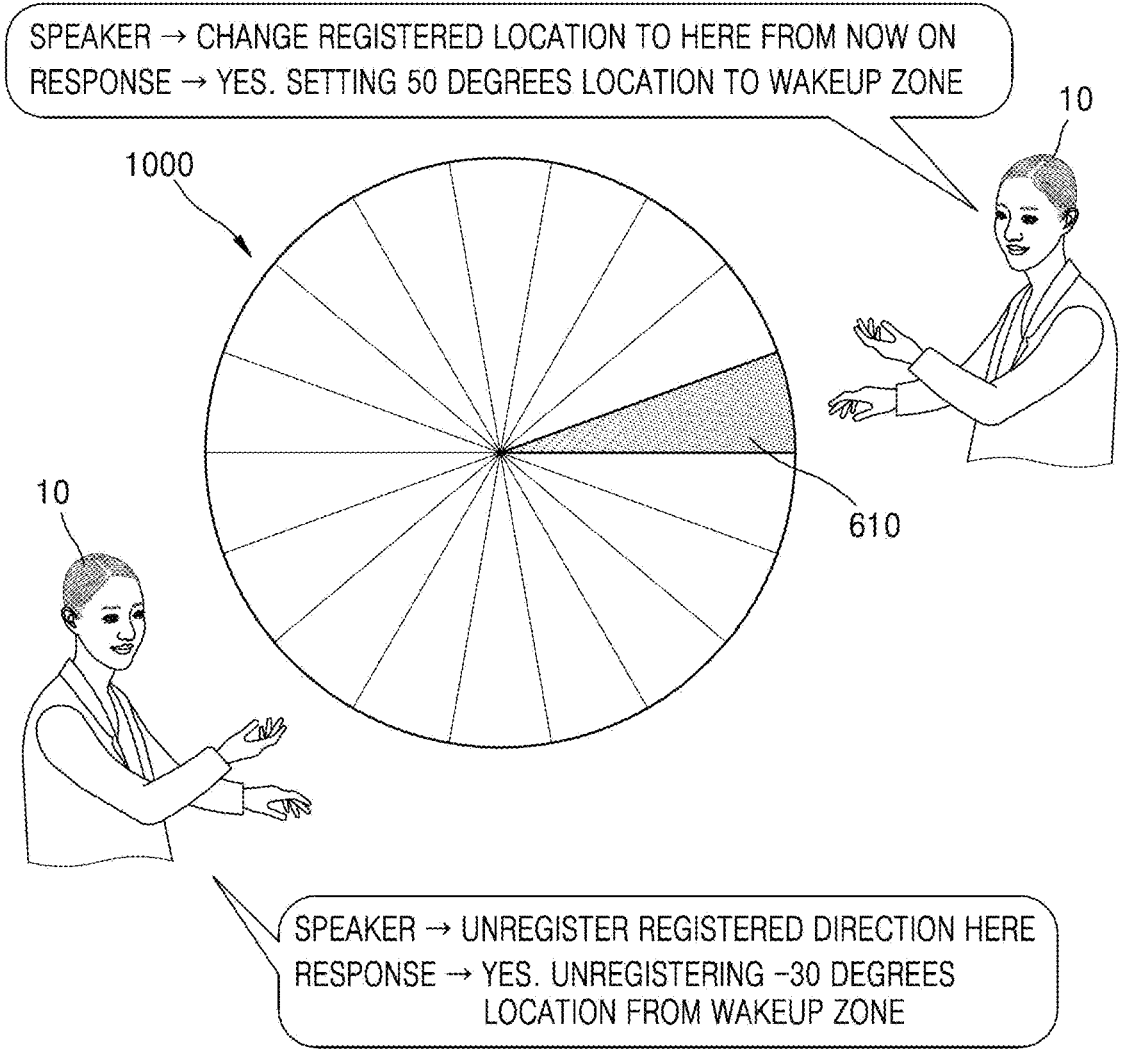
FIG. 6 is a diagram showing a method by which a device sets or unregisters a registered direction, according to an embodiment of the disclosure.

FIG. 6 is a diagram showing a method by which a device sets or unregisters a registered direction, according to embodiments of the disclosure.

Referring to FIG. 6, the device 1000 may set or unregister a registered direction based on a speech signal of a user. Whether to set or unregister a registered direction based on a speech signal of a user may be determined by the AI server 3000 or the device 1000.

For example, the device 1000 may receive a speech signal "change registered location to here from now on" from the sound source 10 and transmit the received speech signal and the direction of the received speech signal to the AI server 3000. The AI server 3000 may determine that the received speech signal is a user request for setting a registered direction and set a direction range to which the direction of the received speech signal belongs to as the registered direction, and transmit information about the set registered direction to the device 1000.

Also, for example, the device 1000 may store keywords "registered location," "registered region," "registered direction," and "wake-up zone" as registered direction keywords. Also, the device 1000 may store keywords "set," "register," and "change" as setting keywords. Furthermore, the device 1000 may store keywords "delete" and "unregister" as clearing keywords.

Accordingly, as a registered direction keyword "registered location" is detected from a received speech signal, the device 1000 may determine whether there is a setting keyword or a unregistering keyword from among words received together with the registered direction keyword and, as a setting keyword "change" is detected, may determine the direction of the received speech signal and store the determined direction as a registered direction.

Furthermore, the device 1000 may receive a speech signal "unregister here from registered location" from the sound source 10. As a registered direction keyword "registered location" is detected from the received speech signal and an unregistering keyword "unregister" is detected from words received together with the registered direction keyword, the device 1000 may determine the direction of the received speech signal and unregister the determined direction from the registered direction.

The device 1000 or the AI server 3000 may determine a direction range to which the direction of a speech signal belongs from among a plurality of direction ranges as a registered direction. For example, when the direction of a received speech signal is 150 degrees, it is determined that the received speech signal belongs to a fourth direction range indicating angles from 135 degrees to 180 degrees, and the fourth direction range indicating angles from 135 degrees to 180 degrees may be determined as a registered direction.

Also, the device 1000 or the AI server 3000 may unregister a registered direction set to a direction range to which the direction of a speech signal belongs from among a plurality of direction ranges. For example, when the direction of a received speech signal is −30 degrees, it is determined that the direction of the received speech signal belongs to an eighth direction range indicating angles from 0 degree to −45 degrees, and the eighth direction range indicating angles from 0 degree to −45 degrees may be unregistered from the registered direction.

The device 1000 may output a speech indicating that the direction of a received speech signal is set to or unregistered from a registered direction. Furthermore, the device 1000 may display a region in the device 1000 corresponding to a registered direction distinctively from the other regions in the device 1000. For example, the device 1000 may control a light-emitting device 610 or a display panel in a region corresponding to a registered direction, thereby displaying the color of the region corresponding to the registered direction differently from a color of regions not corresponding to the registered direction.

As the device 1000 sets or unregisters a registered direction, the device 1000 may store information about the registered direction and transmit the information to the AI server 3000 or the mobile device 5000.

Figure 7:
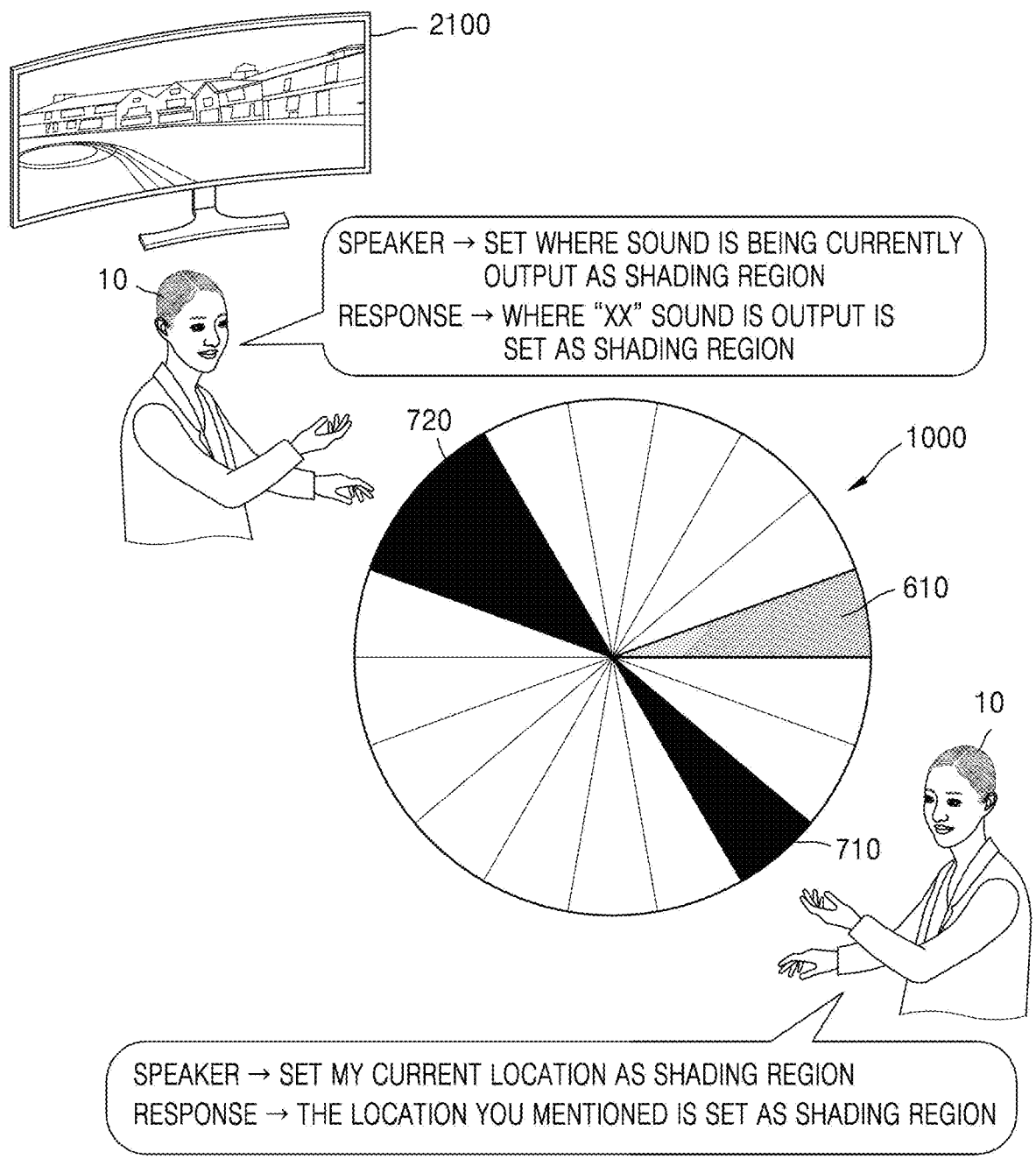
FIG. 7 is a diagram showing a method by which a device sets or unregisters a registered direction, according to an embodiment of the disclosure.

FIG. 7 is a diagram showing a method by which a device sets or unregisters a shading direction, according to various embodiments of the disclosure.

Referring to FIG. 7, the device 1000 may set or unregister a shading direction based on a speech command of a user.

The method of setting or unregistering a shading direction based on a speech command of a user is similar to the method of setting or unregistering a registered direction of FIG. 6, and thus the method of setting or unregistering a shading direction may be described with reference to FIG. 6.

Furthermore, when a speech signal "set a place from which sound is currently being output site to a shading region" of a user is received, the device 1000 may set directions of sound signals except the direction of the speech signal of the user as shading directions. For example, when the device 1000 receives a sound signal output from a TV together with a speech signal of a user, the device 1000 may set only the direction of the sound signal output from the TV as a shading direction. According to embodiments, the device 1000 may set the direction of the speech signal of the user to a shading direction as well.

The device 1000 may inform the direction set as the shading direction to the user. For example, as only the direction of a sound output from a TV is set as the shading direction, the device 1000 may analyze the characteristics of a received sound, recognize that the received sound is a sound output from the TV, and output a speech "the origin of the sound of the TV is set as a shading region."

Furthermore, when a speech signal "Hello" is being output from the TV, the device 1000 may recognize a speech output from the TV and output a speech "the origin of the speech Hello is set as a shading region."

Furthermore, the device 1000 may display a region in the device 1000 corresponding to a shading direction distinctively from the other regions in the device 1000. For example, the device 1000 may display the color of a region corresponding to a shading direction differently from a color of the other regions by not turning on light-emitting devices 710 and 720 in regions corresponding to the shading direction.

As a direction in which a user does not speak or a direction in which a noise (e.g., sounds from a TV) is output is set as a shading direction based on a location where the device 1000 is installed, the device 1000 may prevent an error in recognition of a speech of the user.

For example, when a speech signal is output from a sound source located in a direction other than a shading direction and a noise signal is output from a sound source located in the shading direction, the device 1000 may detect only the speech signal output from the sound source in the direction other than the shading direction and ignore sound signals received from the shading direction, thereby preventing an error in recognition of a speech of a user. The method will be described below in detail with reference to FIGS. 15 and 16.

Figure 8:
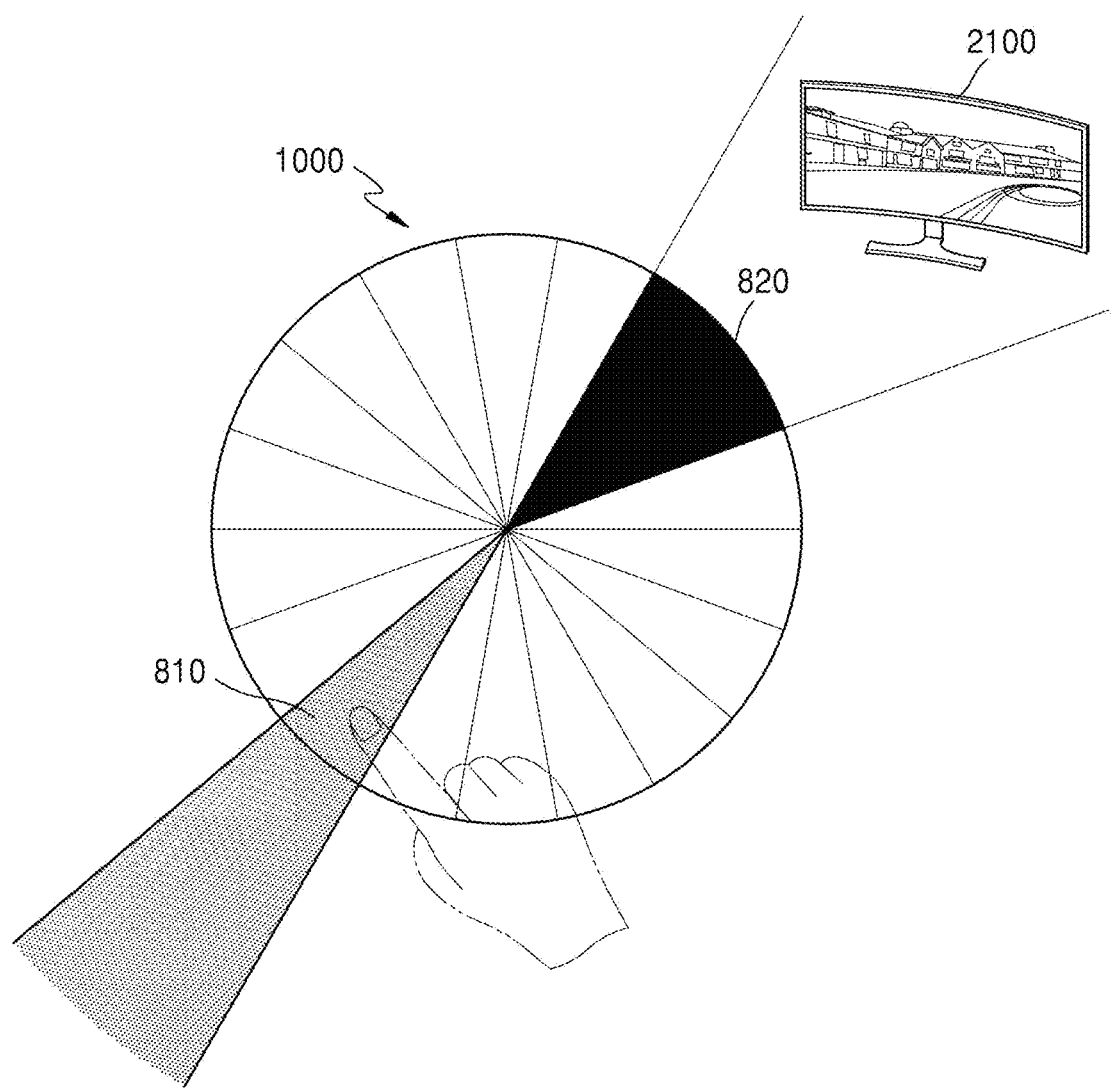
FIG. 8 is a diagram showing a method by which a device sets or unregisters a registered direction or a shading direction, according to an embodiment of the disclosure.

FIG. 8 is a diagram showing a method by which a device sets or unregisters a registered direction or a shading direction, according to various embodiments of the disclosure.

Referring to FIG. 8, the device 1000 may receive a touch input for setting or unregistering a registered direction or a shading direction.

The device 1000 may include a plurality of touch sensors corresponding to a plurality of direction ranges. As a user input for touching a first touch sensor 810 from among the plurality of touch sensors is received, the device 1000 may set a direction range corresponding to the first touch sensor 810 as the registered direction. Furthermore, as a user input for touching the first touch sensor 810 one more time is received, the device 1000 may set the direction range corresponding to the first touch sensor 810 as the shading direction. Furthermore, as a user input for touching the first touch sensor 810 one more time is received, the device 1000 may unregister the shading direction.

Furthermore, according to various embodiments of the disclosure, the device 1000 may perform setting the registered direction, setting the shading direction, and unregistering the shading direction as user inputs for inputting one touch, two consecutive touches, or a long touch. For example, when the device 1000 receives a user input for touching a touch sensor 820 in a direction in which a TV 2100 is located from among the plurality of touch sensors, the device 1000 may set the direction in which the TV 2100 is located as the shading direction.

Furthermore, the device 1000 may output a speech informing that the registered direction is set, a speech informing that the shading direction is set, or a speech informing that the shading direction is unregistered or change the color of a touched region every time the registered direction or the shading direction is set or unregistered.

Figure 9:
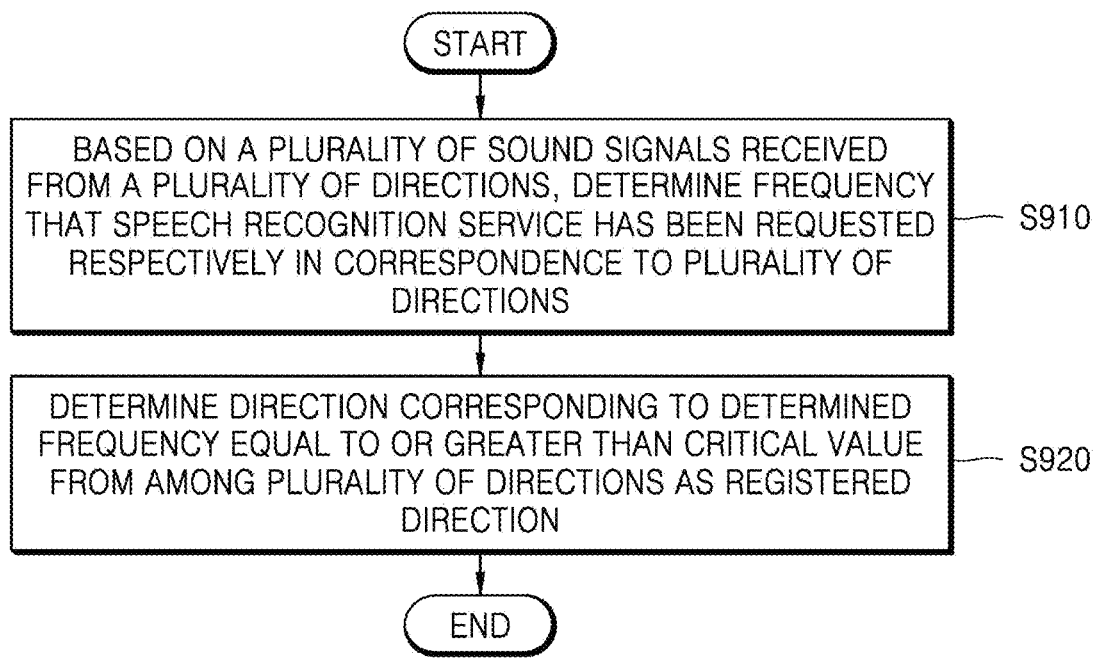
FIG. 9 is a flowchart of a method by which a device determines a registered direction or a shading direction based on a frequency that a speech recognition service is requested, according to an embodiment of the disclosure.

FIG. 9 is a flowchart of a method by which a device determines a registered direction or a shading direction based on a frequency that a speech recognition service is requested, according to various embodiments of the disclosure.

Referring to FIG. 9, in operation S910, the device 1000 may determine a frequency that a speech recognition service is requested in correspondence to each of a plurality of directions based on a plurality of sound signals received from the plurality of directions.

The device 1000 may determine the direction from which a speech signal requesting the speech recognition service is received. A speech signal requesting a speech recognition service may include a speech signal including a wake-up keyword or a speech signal received from a registered direction. Also, the device 1000 may determine a frequency that speech signals requesting the speech recognition service are received during a reference amount of time in correspondence to each of the plurality of directions. The reference amount of time may be, for example, a week or a month. Also, the plurality of directions may be a plurality of direction ranges. For example, the device 1000 may determine a frequency that the speech recognition service is requested during the reference amount of time in correspondence to a first direction range indicating angles from 0 degrees to 45 degrees.

The device 1000 may determine the number of speech recognition services requested by a sound source located within the first direction range as a frequency corresponding to the first direction range. Furthermore, the device 1000 may determine the number of speech recognition services requested by a sound source located in within the first direction range with respect to the total number of speech recognition services requested from all directions during the reference amount of time as a frequency corresponding to the first direction range.

In operation S920, the device 1000 may determine a direction with a determined frequency equal to or greater than a critical value from among a plurality of directions as a registered direction.

For example, the critical value for setting a registered direction may be 70%. In this case, the device 1000 may determine a direction range with a determined frequency of 70% or greater as a registered direction. Furthermore, when a frequency corresponding to a direction range pre-set as a registered direction is lower than or equal to a pre-set frequency (e.g., 30%), that is, when the number of times that a speech recognition service is requested from the registered direction is small, the device 1000 may unregister a registered direction set to the direction range lower than or equal to 30%. Also, when a frequency corresponding to a direction range not set as a registered direction is 0, that is, when no request for a speech recognition service has been received, a shading direction may be set in correspondence to the direction range with the zero frequency.

Also, according to an embodiment, a registered direction and a shading direction may be set through machine learning.

Figure 10:
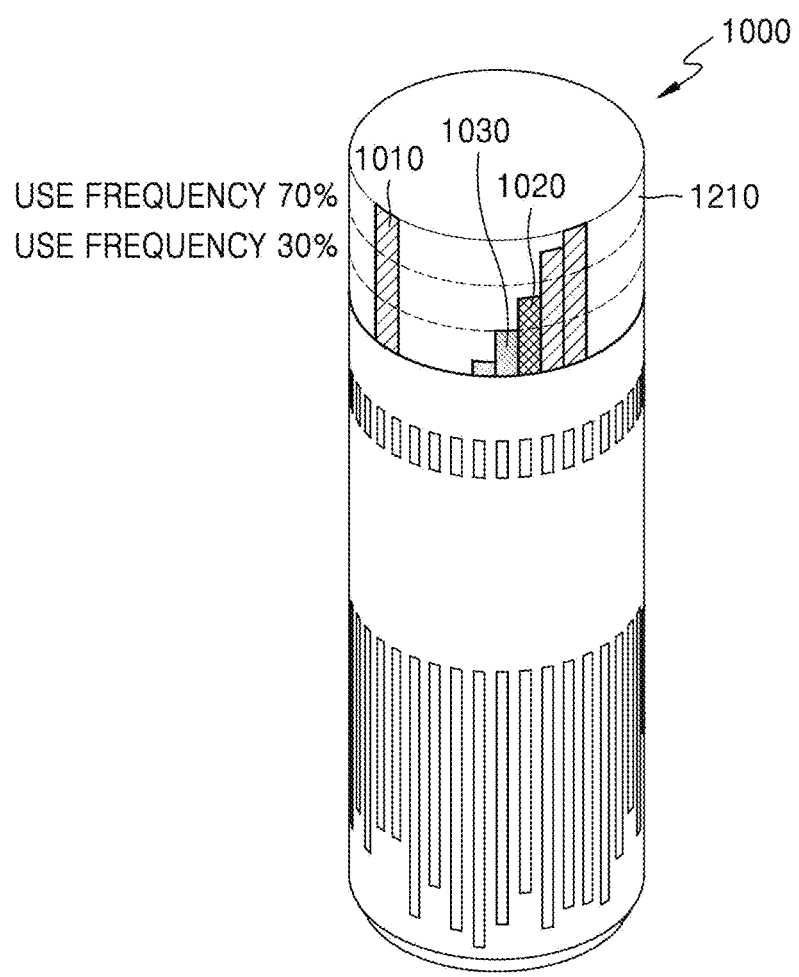
FIG. 10 is a diagram showing a method by which a device displays a frequency that a speech recognition service has been requested in correspondence to a plurality of directions, according to an embodiment of the disclosure.

FIG. 10 is a diagram showing a method by which a device displays a frequency that a speech recognition service has been requested in correspondence to a plurality of directions, according to various embodiments of the disclosure.

Referring to FIG. 10, the device 1000 may display respective frequencies that a speech recognition service has been requested in correspondence to a plurality of directions as bar graph images 1010, 1020, and 1030 on a display 1210. In this case, the device 1000 may display a direction range (direction range corresponding to the direction range in which the bar graph image 1010 is displayed on the device 1000) set as a registered direction, a direction range (direction range corresponding to the direction range in which the bar graph image 1020 is displayed on the device 1000) not set as a registered direction or a shading direction, and a direction range (direction range corresponding to the direction range in which the bar graph image 1030 is displayed on the device 1000) set as a shading direction. Also, according to embodiments, the device 1000 may display a critical value for setting a registered direction and a critical value for setting a shading direction.

Furthermore, the device 1000 may automatically set a registered direction or a shading direction by learning speech signals requesting a speech recognition service in correspondence to a plurality of direction ranges, respectively, by using the AI server 3000.

The AI server 3000 may learn to output a set value to be set to a direction from which a speech signal is received when a set value pre-set to a direction range from which the speech signal is received and a frequency that a speech recognition service has been requested from the direction range from which the speech signal is received are input.

The set value may be one of a registered direction, a general direction, and a shading direction. The direction may refer to a direction in which a speech recognition service is provided even when a wake-up keyword is not received, the general direction may refer to a direction in which a speech recognition service is provided only when a wake-up keyword is received, and the shading direction may refer to a direction in which, when sound signals are received from a plurality of sound sources, a speech signal received from the shading direction is regarded as noise and is not detected.

Accordingly, a user may recognize a location at which the user frequently uses a wake-up keyword, and a registered direction or a shading direction may be automatically set to the device 1000 even when the user does not set the registered direction or the shading direction separately.

FIG. 11 is a diagram showing information about a registered direction and a shading direction stored in the device 1000, according to various embodiments of the disclosure.

Referring to FIG. 11, the device 1000 may store a registered direction or a shading direction in correspondence to each of a plurality of direction ranges. For example, when the plurality of direction ranges include eight ranges including 45 degrees each, a third direction range indicating angles from 90 degrees to 135 degrees may be set as a registered direction, and a sixth direction range indicating angles from −135 degrees to −90 degrees is set as a shading direction, the device 1000 may store a set value indicating the registered direction in correspondence to the third direction range and may store a set value indicating the shading direction in correspondence to the sixth direction range. Also, according to embodiments, the AI server 3000 or the mobile device 5000 may also store information about the registered direction and the shading direction.

Figure 12:
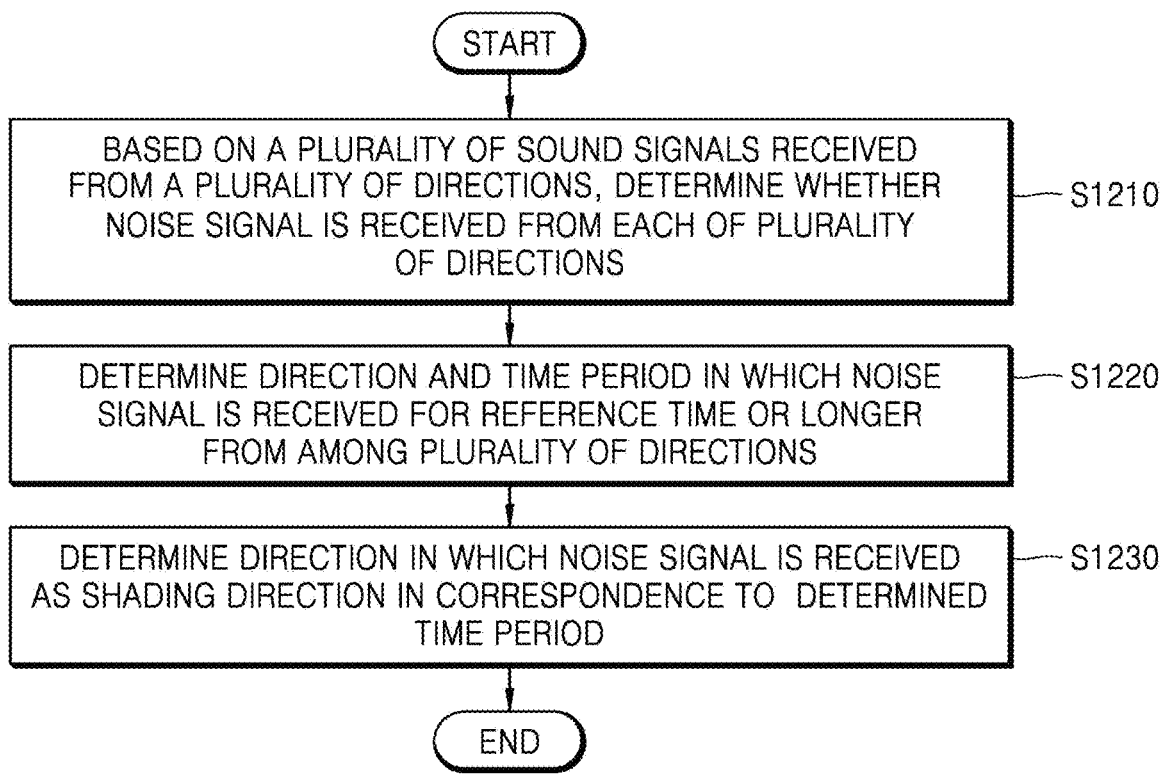
FIG. 12 is a flowchart of a method by which a device sets a shading direction based on characteristics of a received sound signal, according to an embodiment of the disclosure.

FIG. 12 is a flowchart of a method by which a device sets a shading direction based on characteristics of a received sound signal, according to various embodiments of the disclosure.

Referring to FIG. 12, in operation S1210, the device 1000 may determine whether a noise signal is received from each of a plurality of directions based on a plurality of sound signals received from the plurality of directions.

The noise signal may refer to all sound signals other than a speech signal of a user. For example, the noise signal may include sounds output from a TV and sounds generated as a washing machine or an air conditioner is operated. Furthermore, the noise signal may be a mechanical sound output from an electronic device.

The device 1000 may determine whether a received sound is a noise signal. The device 1000 may store characteristics of sound signals generated from respective home appliances. Accordingly, the device 1000 may detect characteristics from a received sound signal, compare the detected characteristics with characteristic stored in advance, and identify a sound source.

Furthermore, according to embodiments, the device 1000 may convert a sound signal to sound data, transmit the sound data to the AI server 3000, and the AI server 3000 may use a deep learning algorithm to determine whether the sound signal includes a noise signal and a sound source that outputs the noise signal.

In operation S1220, the device 1000 may determine a direction and a time period in which noise signals are received over a reference time period from among a plurality of directions. For example, the device 1000 may determine a direction and a time period in which noise signals are received for an hour or longer, based on sound signals received for a week. For example, the device 1000 may statistically determine that noise signals are received from a sound source located in a third direction range from 7 pm to 10 pm. This method will be described below with reference to FIG. 13A.

In operation S1230, the device 1000 may determine a direction in which noise signal is received, as a shading direction in accordance with the determined time period.

Furthermore, the device 1000 may learn whether to set a shading direction by using the pre-set trained model. This method will be described below with reference to FIG. 13B.

The device 1000 may output a speech message indicating that a direction determined in correspondence to a determined time period is set as a shading direction. Also, the device 1000 may output a speech message asking a user whether to set the determined direction as the shading direction before setting the shading direction. In this case, the device 1000 may not set the shading direction depending on responses of the user.

The device 1000 may also output a speech message asking whether an identified sound source is located in a determined direction. The device 1000 may transmit information about the identified sound source and the response of the user to the AI server 3000, and the AI server 3000 may modify and refine a deep learning algorithm based on the user's response.

Accordingly, even when the user does not set a shading direction separately, the device 1000 may learn the life pattern of the user and automatically set the shading direction.

Figure 13A:
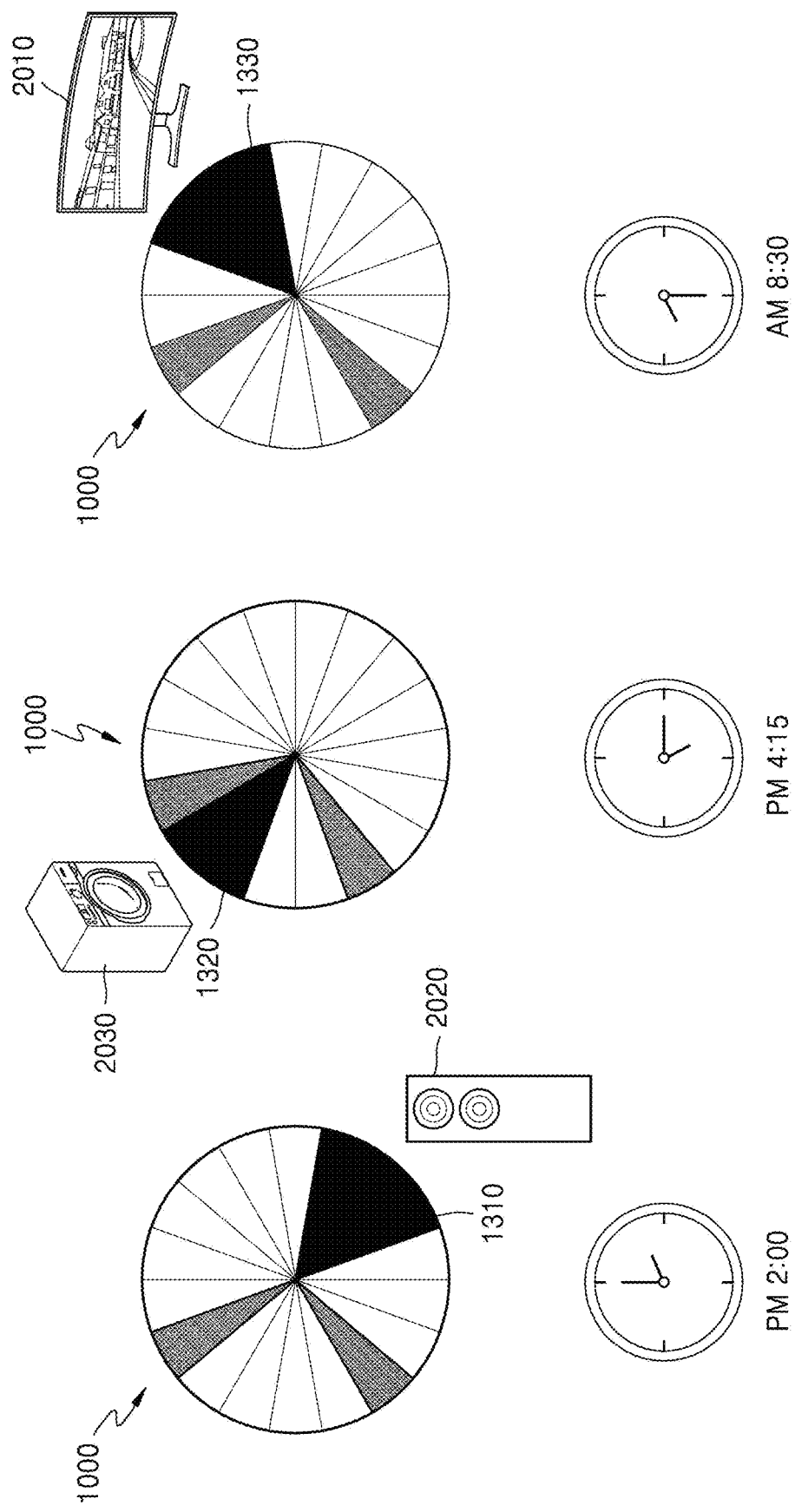
Figure 13B:
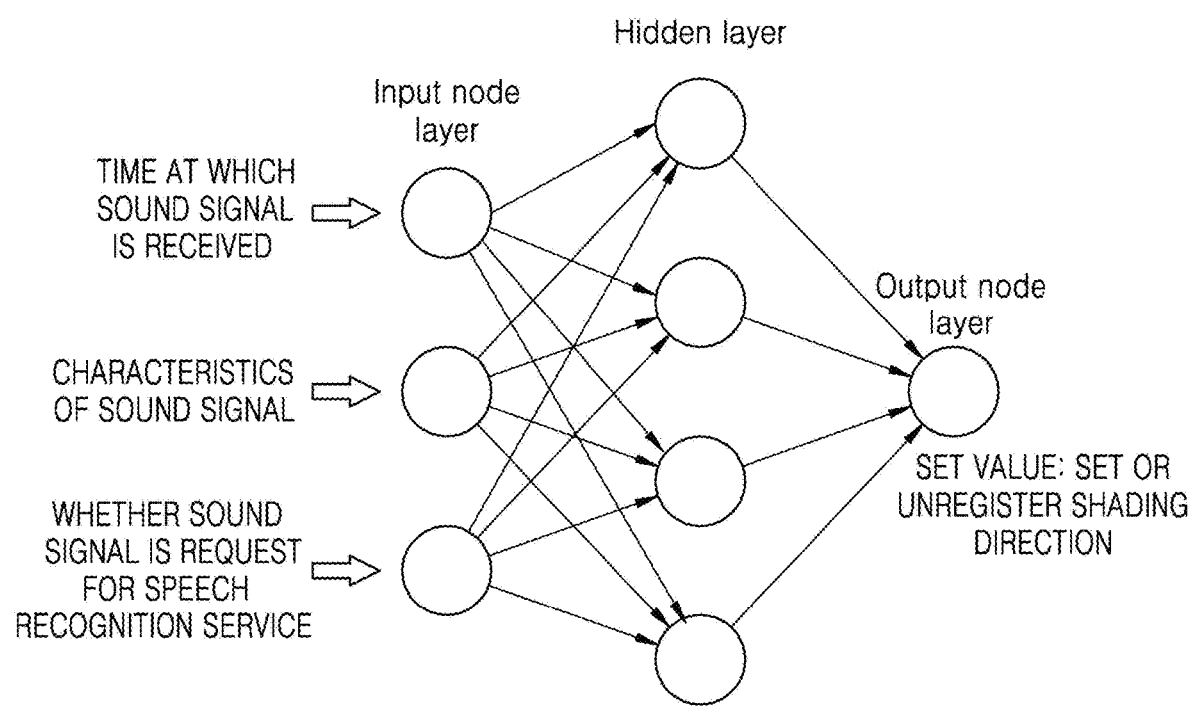

FIGS. 13A, 13B, and 14 are diagrams showing methods by which a device sets a shading direction based on characteristics of received sound signals, according to various embodiments of the disclosure.

Referring to FIG. 13A, the device 1000 may determine a type of a sound source based on a received sound signal and set different shading directions for respective time periods.

For example, a direction 1310 in which an air conditioner 2020 is located may be set as a shading direction in correspondence to a time period from 2:00 pm to 4:00 pm, a direction 1320 in which a washing machine 2030 is located may be set as a shading direction in correspondence to a time period from 4:00 pm to 5:00 pm, and a direction 1330 in which a TV 2010 is located may be set as a shading direction in correspondence to a time period from 8:00 am to 10:30 am.

Referring to FIG. 13B, the device 1000 may learn a life pattern of a user and automatically set a shading direction.

For example, based on a pre-set trained model, the device 1000 may train to output whether to set a direction from which a sound signal is received as a shading direction when a time at which the sound signal is received, characteristics of the sound signal, and information indicating whether the sound signal is a request for a speech recognition service are input.

The AI server 3000 may determine whether a received sound signal is noise and the type of the sound source based on the characteristics of the received sound signal. For example, characteristics of sound signals output by sound sources may be stored in correspondence to types of the sound sources. Accordingly, the AI server 3000 may determine the type of a sound source based on characteristics of a received sound signal. The AI server 3000 may also determine whether a received sound signal is a request for a speech recognition service.

Accordingly, when noises are output from a first direction by a first sound source for a reference amount of time or longer, the AI server 3000 may set a shading direction in correspondence to the first direction and the time period during which noises are output.

Furthermore, even when noises are output from the first direction by the first sound source for a reference amount of time or longer, when the AI server 3000 receives a speech signal requesting a speech recognition service from the first direction during the time period during which noise signals are output, the AI server 3000 may not set a shading direction in correspondence to the first direction and the time period during which the noise signals are output.

Referring to FIG. 14, the device 1000 may store different shading directions in correspondence to a plurality of time periods, respectively.

Figure 15:
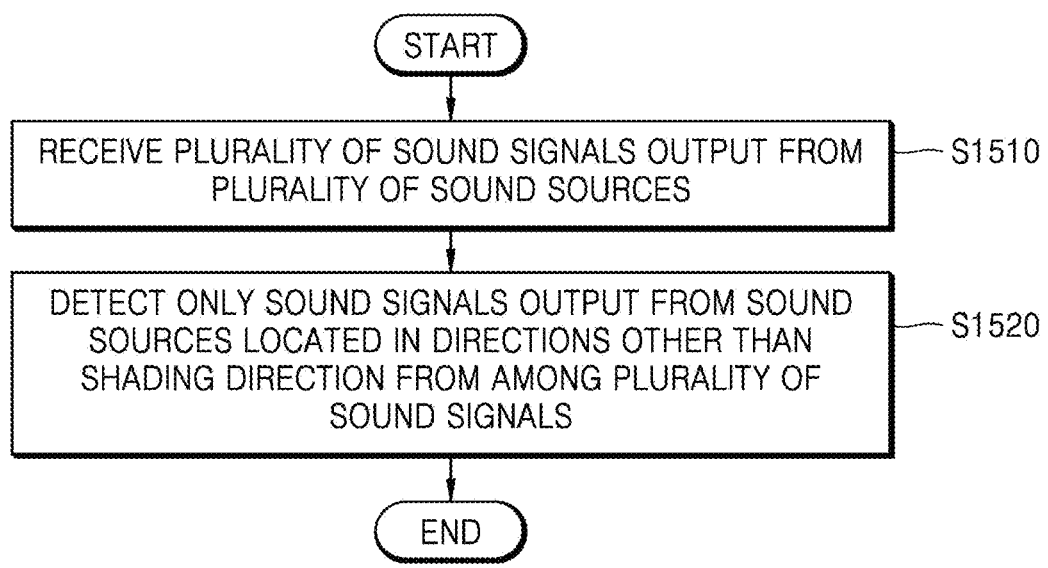
FIG. 15 is a flowchart of a method for processing a sound signal received from a sound source located in a shading direction, according to an embodiment of the disclosure.

FIG. 15 is a flowchart of a method for processing a sound signal received from a sound source located in a shading direction, according to various embodiments of the disclosure.

Referring to FIG. 15, in operation S1510, the device 1000 may receive a plurality of sound signals output from a plurality of sound sources.

The device 1000 may simultaneously receive the plurality of sound signals output from the plurality of sound sources. The plurality of sound sources may include a sound source located in a shading direction and a sound source located in directions other than the shading direction.

In operation S1520, the device 1000 may detect only sound signals output from the sound sources located in the directions other than the shading direction from among the plurality of sound signals.

The device 1000 may not detect a sound signal output from the sound source located in the shading direction by detecting only sound signals output from the sound sources located in the directions other than the shading direction from among the plurality of sound signals.

For example, when the device 1000 determines a direction to a sound source by using the SRP-PHAT algorithm, beam-forming power outputs may be calculated only for the directions other than the shading direction and a direction corresponding to a beam-forming power output equal to or greater than a critical value may be determined as the direction to the sound source. Therefore, a sound signal output from the sound source located in the shading direction may be regarded as noise and may not be detected.

According to embodiments, the device 1000 may calculates a precise direction to the sound source located in the shading direction by calculating beam-forming power outputs for all directions including the shading direction and may not detect a sound signal output from the sound source located in the shading direction by determining whether a calculated direction belongs to the shading direction.

Accordingly, the device 1000 may detect only sound signals output from sound sources located in directions other than the shading direction from among received sound signals and provide a speech recognition service based on the detected sound signals.

Furthermore, when the direction of a received speech signal is determined as a shading direction, the device 1000 does not recognize a wake-up keyword included in the received speech signal, thereby not recognizing a request for a speech recognition service spoken by a user located in the shading direction.

Also, according to embodiments, even when the device 1000 determines that the direction of a received speech signal is a shading direction, when the received speech signal includes a wake-up keyword, the device 1000 may provide a speech recognition service based on the received speech signal.

Figure 16:
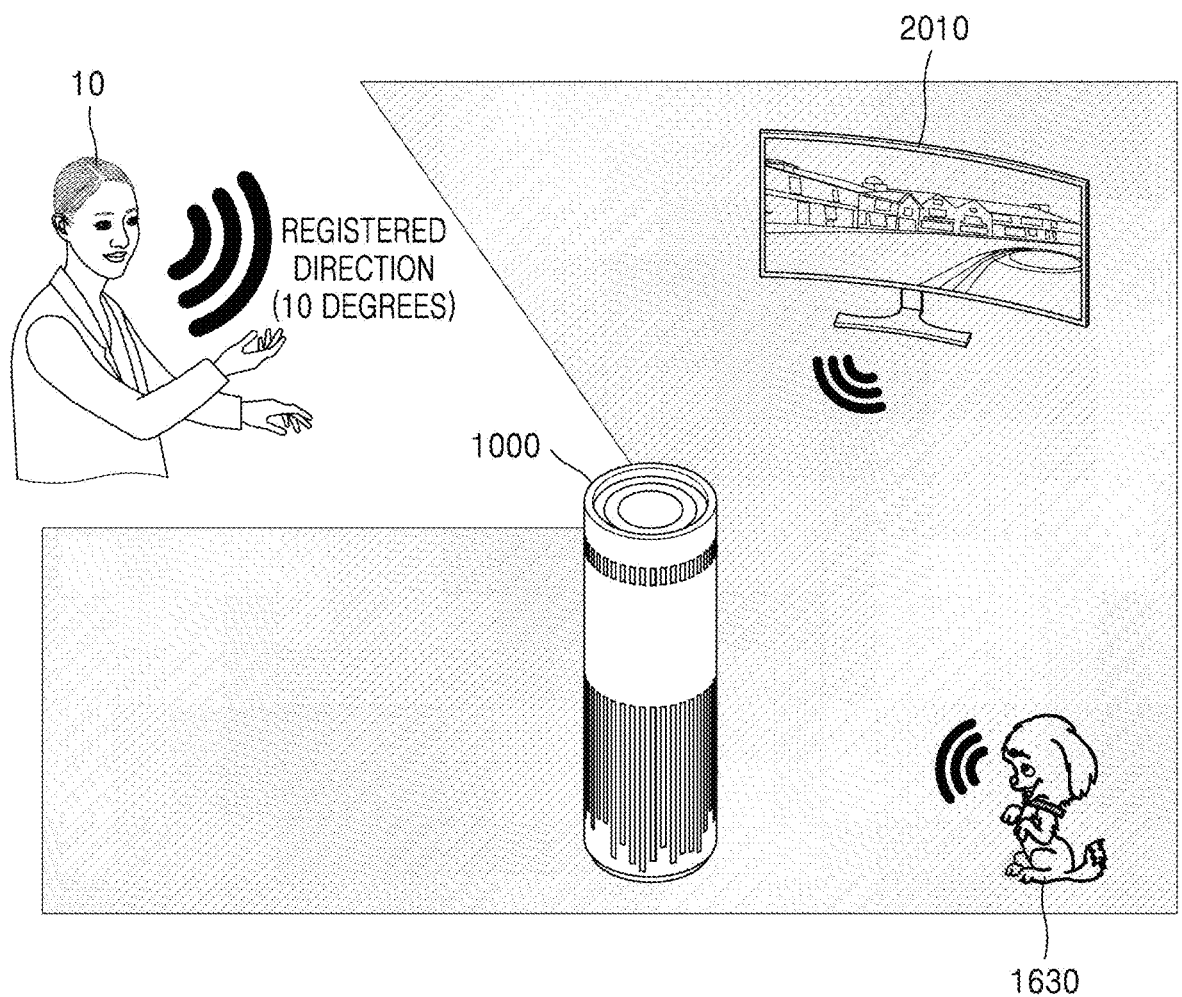
FIG. 16 is a diagram showing a method for processing a sound signal received from a sound source located in a shading direction, according to an embodiment of the disclosure.

FIG. 16 is a diagram showing a method for processing a sound signal received from a sound source located in a shading direction, according to various embodiments of the disclosure.

Referring to FIG. 16, sound signals received by the device 1000 may include a sound signal received from a first sound source (e.g., the sound source 10), a sound signal received from a second sound source (e.g., TV 2010), and a sound signal received from a third sound source 1630.

The device 1000 may determine that the received sound signals are sound signals received from three sound sources and determine a direction to the first sound source (e.g., the sound source 10), a direction to the second sound source (e.g., TV 2010), and a direction to the third sound source 1630. When the direction to the first sound source (e.g., the sound source 10) is in a registered direction and the direction to the second sound source (e.g., TV 2010) and the direction to the third sound source 1630 are shading directions, the device 1000 may detect only a sound signal received from the first sound source (the sound source 10) from among the received sound signals and provide a speech recognition service based on the detected sound signal.

Figure 17:
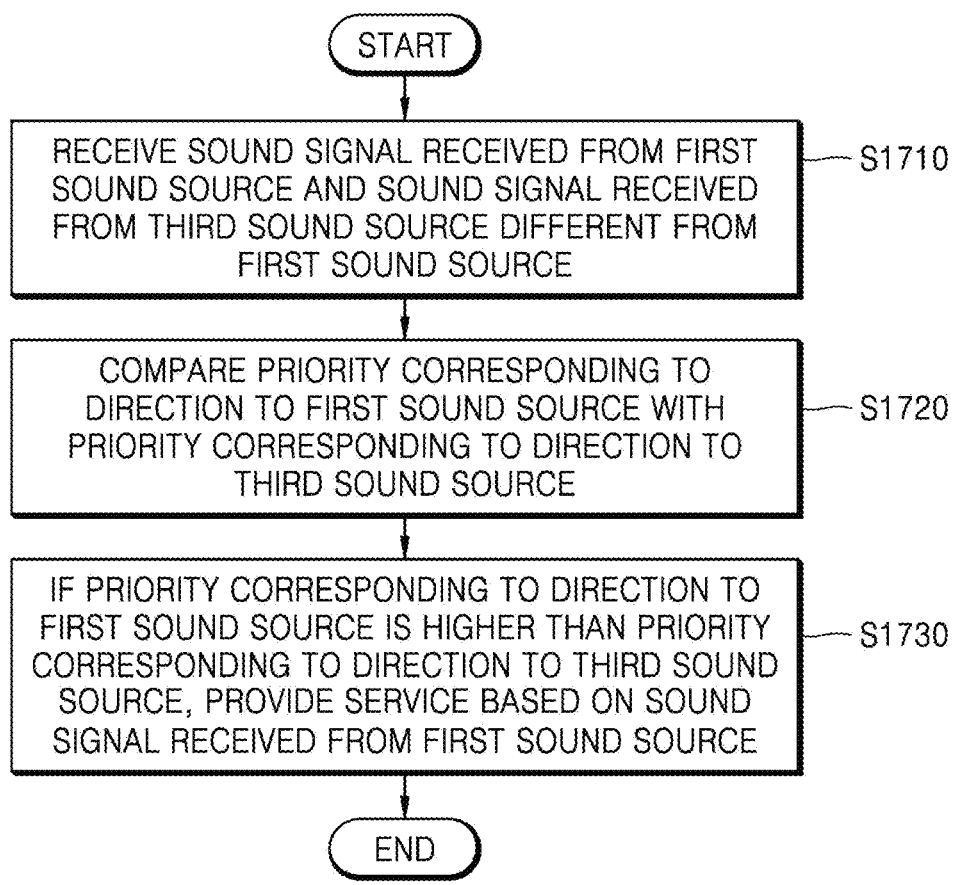
FIG. 17 is a flowchart of a method by which a device provides a speech recognition service based on priorities, according to an embodiment of the disclosure.

FIG. 17 is a flowchart of a method by which a device provides a speech recognition service based on priorities, according to various embodiments of the disclosure.

Referring to FIG. 17, in operation S1710, the device 1000 may receive a sound signal received from a first sound source and a sound signal received from a third sound source, which is different from the first sound source.

In operation S1720, the device 1000 may compare a priority corresponding to a direction to the first sound source with a priority corresponding to a direction to the third sound source.

The device 1000 may receive a user input for setting priorities. For example, as a speech signal of "set my location to first rank" is received, the device 1000 may determine the direction of the speech signal and store a first priority in correspondence to the determined direction. Also, according to embodiments, the device 1000 may determine priorities according to rankings of frequencies of using a wake-up keyword. Also, according to embodiments, as a speech signal for setting priorities is received, the device 1000 may set the direction of the speech signal as a registered direction.

In operation S1730, when the priority corresponding to the direction to the first sound source is higher than the priority corresponding to the direction to the third sound source, the device 1000 may provide a speech recognition service based on the sound signal received from the first sound source.

The device 1000 may detect a sound signal received from the first sound source from among received sound signals and provide a speech recognition service based on the detected sound signal.

Figure 18:
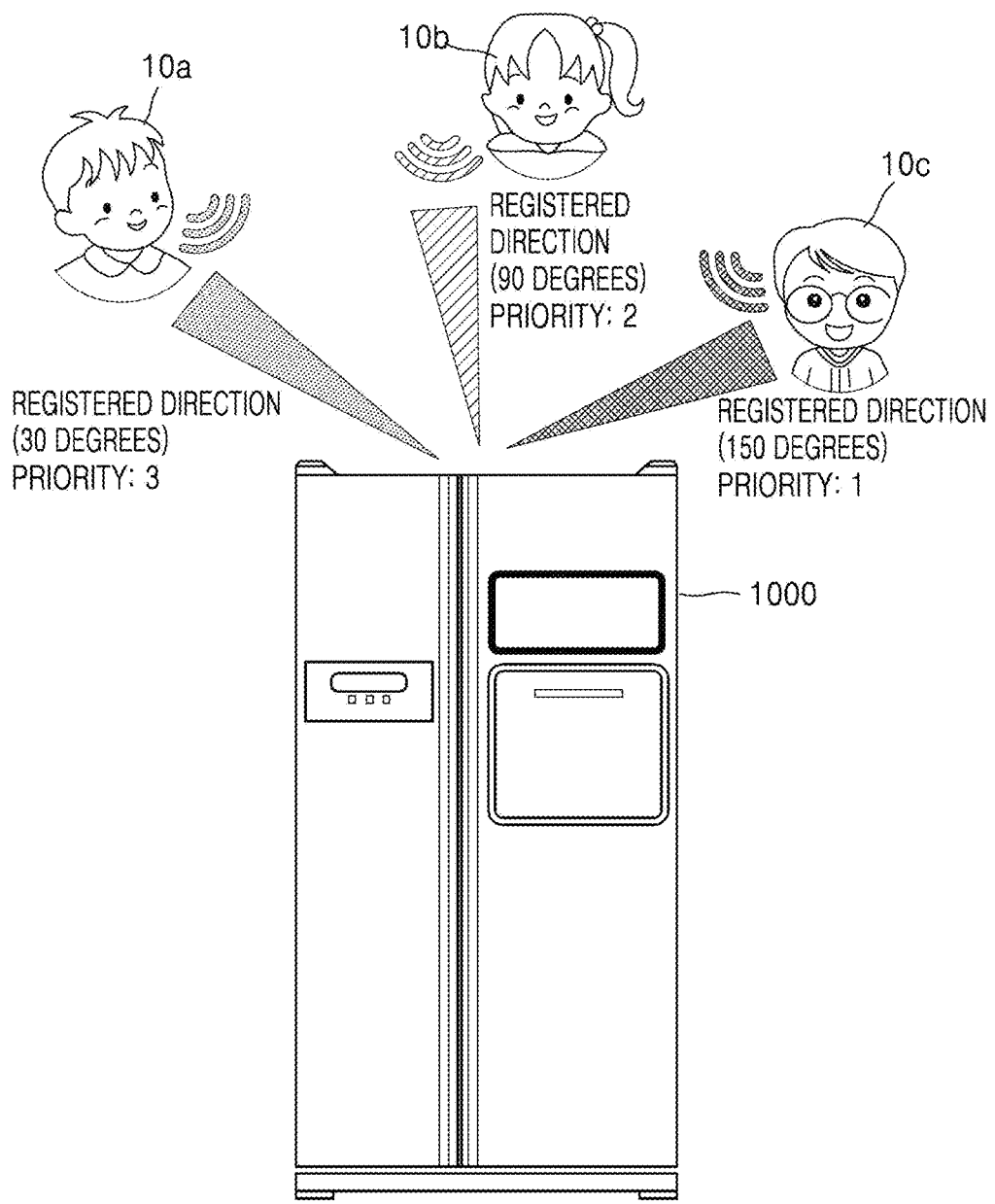
FIG. 18 is a diagram showing a method by which a device provides a speech recognition service based on priorities, according to an embodiment of the disclosure.

FIG. 18 is a diagram showing a method by which a device provides a speech recognition service based on priorities, according to various embodiments of the disclosure.

Referring to FIG. 18, the device 1000 may select a sound source to provide a speech recognition service based on priorities.

The device 1000 may simultaneously receive sound signals from a plurality of sound sources.

The device 1000 may determine respective directions for the plurality of sound sources based on received sound signals. For example, the device 1000 may determine that a first sound source 10*a* is located at 150 degrees, a second sound source 10*b* is located at 90 degrees, and a third sound source 10*c* is located at 30 degrees.

Based on priorities, the device 1000 may detect a sound signal received from the third sound source 10*c* having the highest priority from among received sound signals and provide a speech recognition service based on the detected sound signal.

Figure 19:
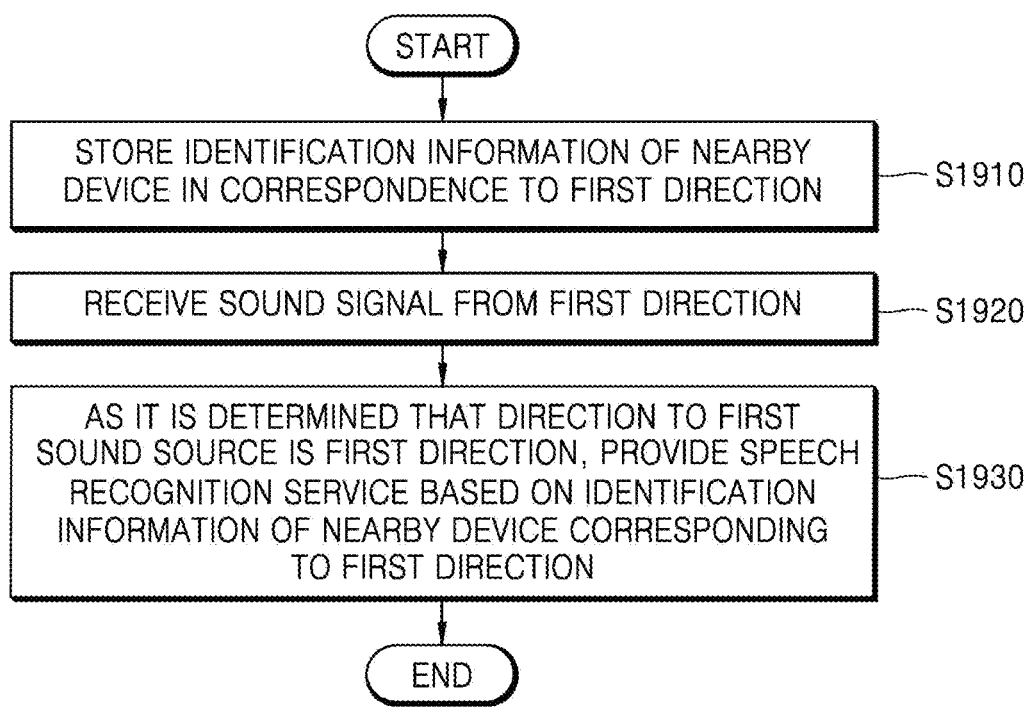
FIG. 19 is a flowchart of a method by which a device provides a speech recognition service in consideration of functions of a home device located in a direction of a speech signal, according to an embodiment of the disclosure.

FIG. 19 is a flowchart of a method by which a device provides a speech recognition service in consideration of functions of a home device located in a direction of a speech signal, according to various embodiments of the disclosure.

Referring to FIG. 19, in operation S1910, the device 1000 may store identification information of the home device 2000 in correspondence to a first direction.

The device 1000 may receive a speech signal for setting the home device 2000 in correspondence to a particular direction. For example, as a speech signal "register here as a refrigerator" is received, the device 1000 may determine the direction of the speech signal and store identification information of a refrigerator in correspondence to the determined direction.

In this case, as home device setting keywords "refrigerator" and "register" are detected from the speech signal, the device 1000 may store the identification information of the refrigerator in correspondence to the determined direction.

Furthermore, the device 1000 may convert a received speech signal into a sentence, transmit the converted sentence to the AI server 3000, and receive message identification information indicating that a message is a home device setting message and home device identification information indicating that the home device 2000 is the "refrigerator" from the AI server 3000. Accordingly, the device 1000 may also store identification information of the refrigerator in correspondence to the determined direction.

Also, according to embodiments, the device 1000 may determine the location of the home device 2000 based on a noise signal generated when the home device 2000 is operated. For example, when a noise signal generated as the refrigerator is operated is received, the device 1000 may determine that a received sound signal is from the refrigerator based on pre-stored characteristics of sound signals of the refrigerator. Accordingly, the device 1000 may also store identification information of the refrigerator in correspondence to the direction of a received noise signal.

Also, according to embodiments, the device 1000 may receive direction information about the home device 2000 from the mobile device 5000. For example, as a user input for setting the location of the home device 2000 is received, the mobile device 5000 may transmit a direction corresponding to the set location and identification information of the home device 2000 to the device 1000.

Also, according to embodiments, the device 1000 may determine the direction of the home device 2000 by communicating with the home device 2000 using the Internet of Things (IoT) technology.

Also, according to embodiments, the AI server 3000 may store identification information of the home device 2000 in correspondence to a first direction.

In operation S1920, the device 1000 may receive a sound signal from a first sound source.

Operation S1920 may be described with reference to operation S510 of FIG. 5.

In operation S1930, when it is determined that a direction to the first sound source is the first direction, the device 1000 may provide a speech recognition service based on the identification information of the home device 2000 corresponding to the first direction.

The device 1000 may transmit identification information of the home device 2000 to the AI server 3000 together with words or a sentence detected from a received sound signal and may receive a speech recognition service related to functions of the home device 2000 from the AI server 3000. The speech recognition service related to functions of the home device 2000 may refer to a speech recognition service that the home device 2000 may provide.

For example, when a TV is stored in correspondence to the first direction and a speech signal "Champions League" is received from a user located in the first direction, the device 1000 may transmit a sentence "Champions League" and identification information of the TV to the AI server 3000. The AI server 3000 may determine a Champions League relay broadcast related to the functions provided by the TV from among speech recognition services related to "Champions League" as a speech recognition service to be provided, based on the identification information of the TV. Accordingly, the AI server 3000 may request the device 1000 to change the channel to a program broadcasting the Champions League. The device 1000 may change the channel of the TV, such that the TV provides a Champions League relay broadcast.

Also, according to embodiments, the device 1000 may transmit direction information about a speech signal to the AI server 3000 together with the sentence "Champions League." The AI server 3000 may obtain identification information of a TV corresponding to the received direction information and request the device 1000 to change the channel to a program broadcasting the Champions League.

Figure 20:
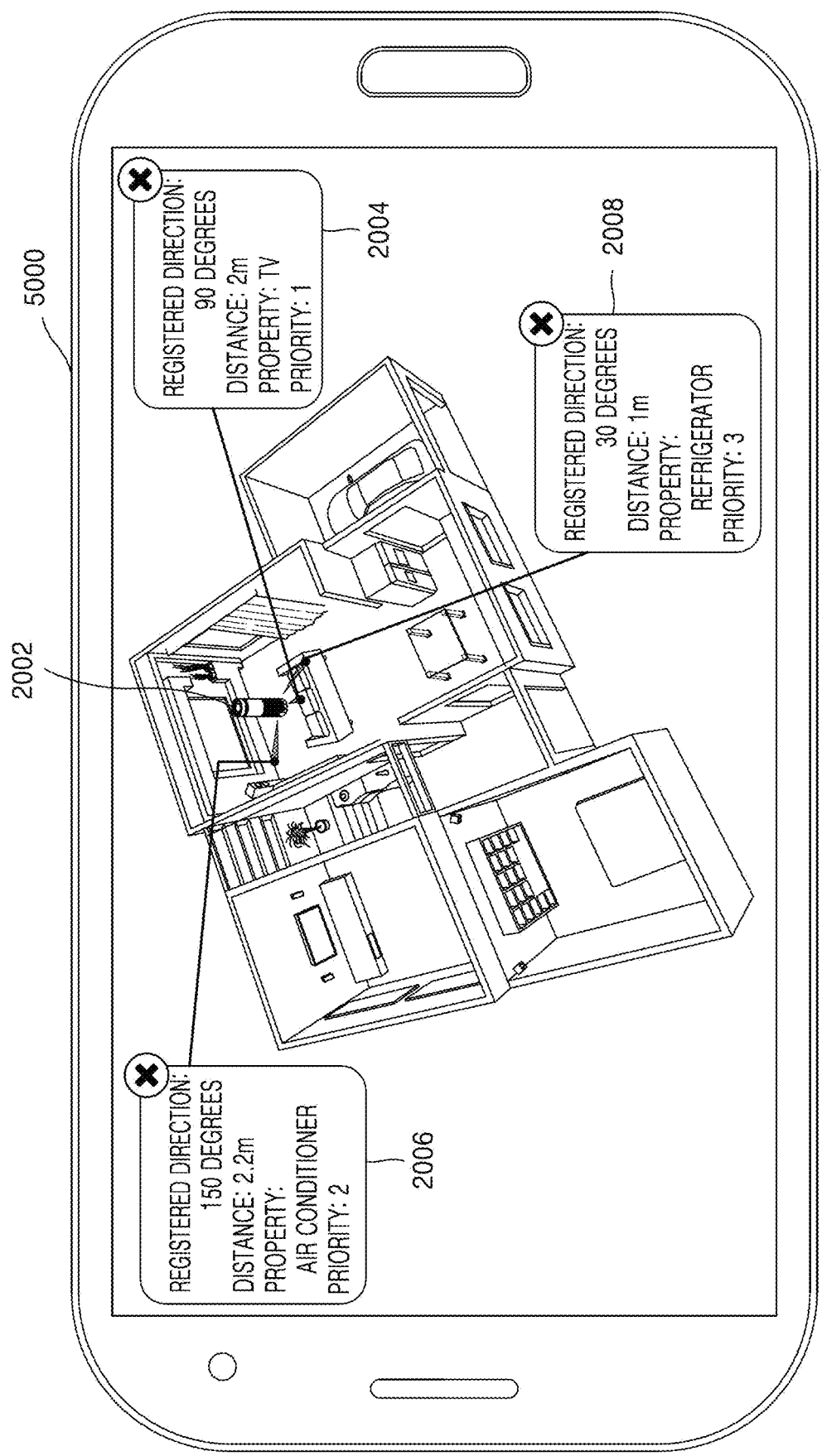
FIG. 20 is a diagram showing a method by which a device provides information stored in correspondence to directions by using a mobile device, according to an embodiment of the disclosure.

FIG. 20 is a diagram showing a method by which a device provides information stored in correspondence to directions by using a mobile device, according to various embodiments of the disclosure.

Referring to FIG. 20, the mobile device 5000 may display a registered direction, a priority of the registered direction, and identification information of the home device 2000 stored in correspondence with the registered direction.

The mobile device 5000 may receive a registered direction set to the device 1000, a priority of the registered direction, and the identification information of the home device 2000 stored in correspondence to the registered direction from the AI server 3000 or the device 1000 and display images 2002, 2004, 2006, and 2008 indicating the received information.

For example, the mobile device 5000 may display an image 2008 indicating that a registered direction is set to a direction of 30 degrees from a reference direction within the device 1000, a refrigerator is registered in correspondence to the registered direction, a distance from the device 1000 to the refrigerator is 1 m, and the priority of the set registered direction is in the third place.

Also, according to embodiments, the mobile device 5000 may receive a user input for designating a location of the device 1000 on the floor plan of a user's house. As a user input for designating a location of the device 1000 on the floor plan of the user's house is received, the mobile device 5000 may display an image 2002 of the device 1000 at the designated location on the floor plan and display a registered direction based on the registered location.

Also, according to embodiments, the mobile device 5000 may receive a user input for setting or unregistering a registered direction or a user input for setting or unregistering a priority in correspondence to a direction and transmit the received user input to the device 1000.

Also, the mobile device 5000 may receive a user input for setting or unregistering the home device 2000 in correspondence to a direction and transmit identification information and the direction of the set or unregistered home device to the device 1000.

Accordingly, the user may identify a region in the user's house where a registered direction is set and may also set a registered direction by using the mobile device 5000.

Figure 21:
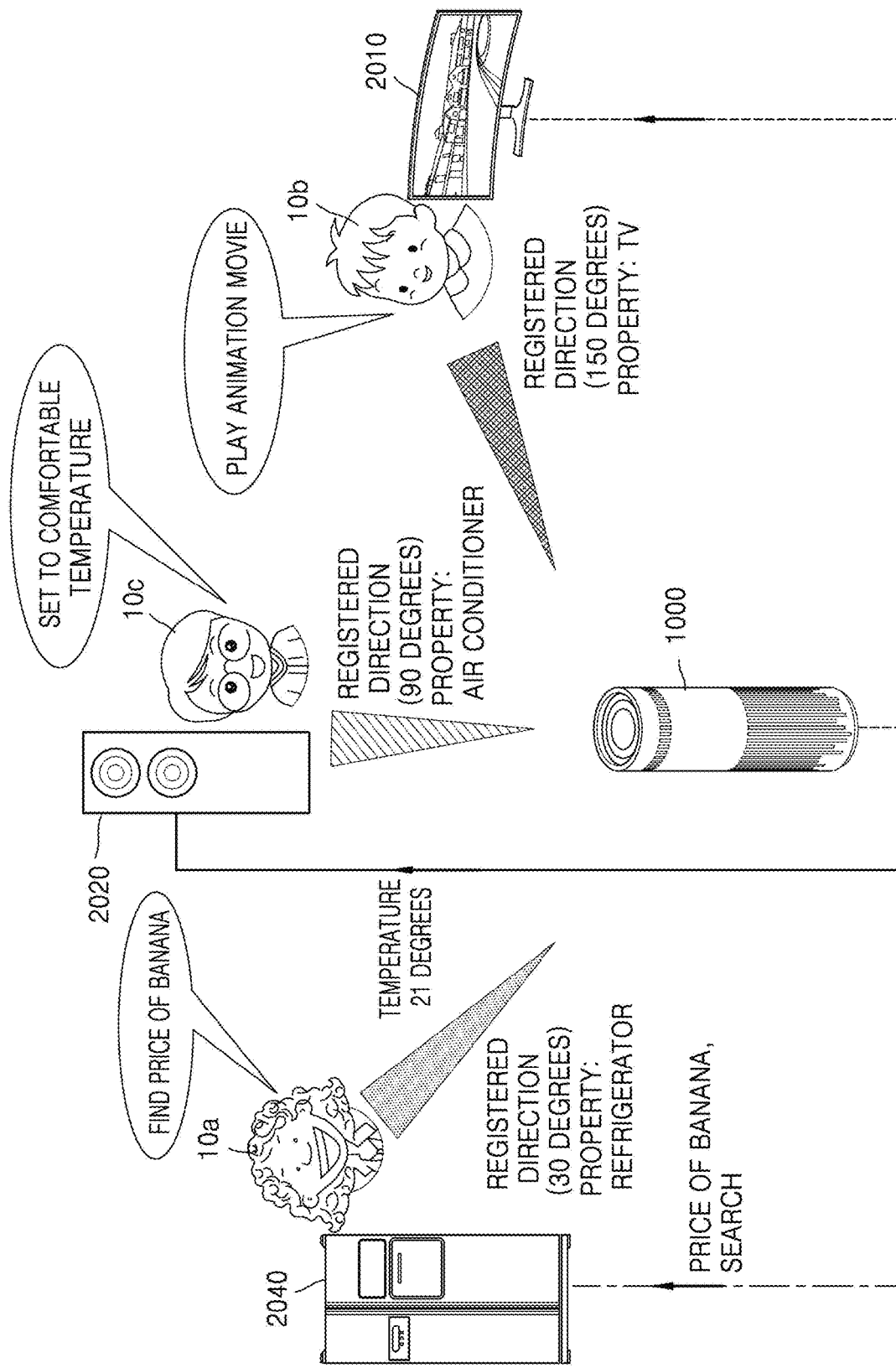
FIG. 21 is a flowchart of a method by which a device provides a speech recognition service in consideration of functions of a home device, according to an embodiment of the disclosure.

FIG. 21 is a flowchart of a method by which a device provides a speech recognition service in consideration of functions of a home device, according to various embodiments of the disclosure.

Referring to FIG. 21, the device 1000 may provide a speech recognition service in consideration of the function of the home device 2000 in correspondence to the direction of a sound signal.

For example, the device 1000 may store identification information of a refrigerator 2040 in correspondence to a registered direction of 30 degrees. Also, the device 1000 may store identification information of the air conditioner 2020 in correspondence to a registered direction of 90 degrees. Also, the device 1000 may store identification information of the TV 2010 in correspondence to a registered direction of 150 degrees.

As a speech signal "play animation movie" is received, the device 1000 may determine that the direction of the speech signal is 150 degrees and obtain identification information of the TV 2010 in correspondence to 150 degrees. Also, the device 1000 may transmit the identification information of the TV 2010 to the AI server 3000 together with the sentence "play animation movie."

The AI server 3000 may search for a channel broadcasting animation movie, a broadcasting program for children, based on the received sentence and the identification information of the TV 2010. The AI server 3000 may transmit a found channel number and a channel change request to the device 1000. The device 1000 may request the TV 2010 to change the channel to the received channel number.

Furthermore, as a speech signal "set to a comfortable temperature" is received, the device 1000 may determine that the direction of the speech signal is 90 degrees and obtain identification information of the air conditioner 2020 in correspondence to 90 degrees. Furthermore, the device 1000 may transmit the identification information of the air conditioner 2020 and information about a current temperature and current humidity to the AI server 3000 together with the sentence "set to a comfortable temperature." The device 1000 may receive a request to adjust the temperature of air conditioner 2020 to 21 degrees from the AI server 3000. The device 1000 may request the air conditioner 2020 to adjust the temperature to 21 degrees.

Furthermore, as a speech signal of "find the price of banana" is received, the device 1000 may determine that the direction of the speech signal is 30 degrees and obtain identification information of the refrigerator 2040 in correspondence to 30 degrees. Also, the identification information of the refrigerator 2040 may be transmitted to the AI server 3000 together with the sentence "find the price of banana." The AI server 3000 may determine a speech recognition service related to an information searching function and a display function from among the functions of the refrigerator 2040 based on the identification information of the refrigerator 2040. For example, the AI server 3000 may transmit an URL address for a web page showing the price of banana and a request to access the URL address and display the web page to the device 1000. The device 1000 may request the refrigerator 2040 to access the URL address and display the web page.

According to embodiments, the AI server 3000 may transmit a request to browse the Internet with a search keyword "price of banana" to the device 1000. The device 1000 may request the refrigerator 2040 to browse the Internet with the search keyword "price of banana."

Figure 22:
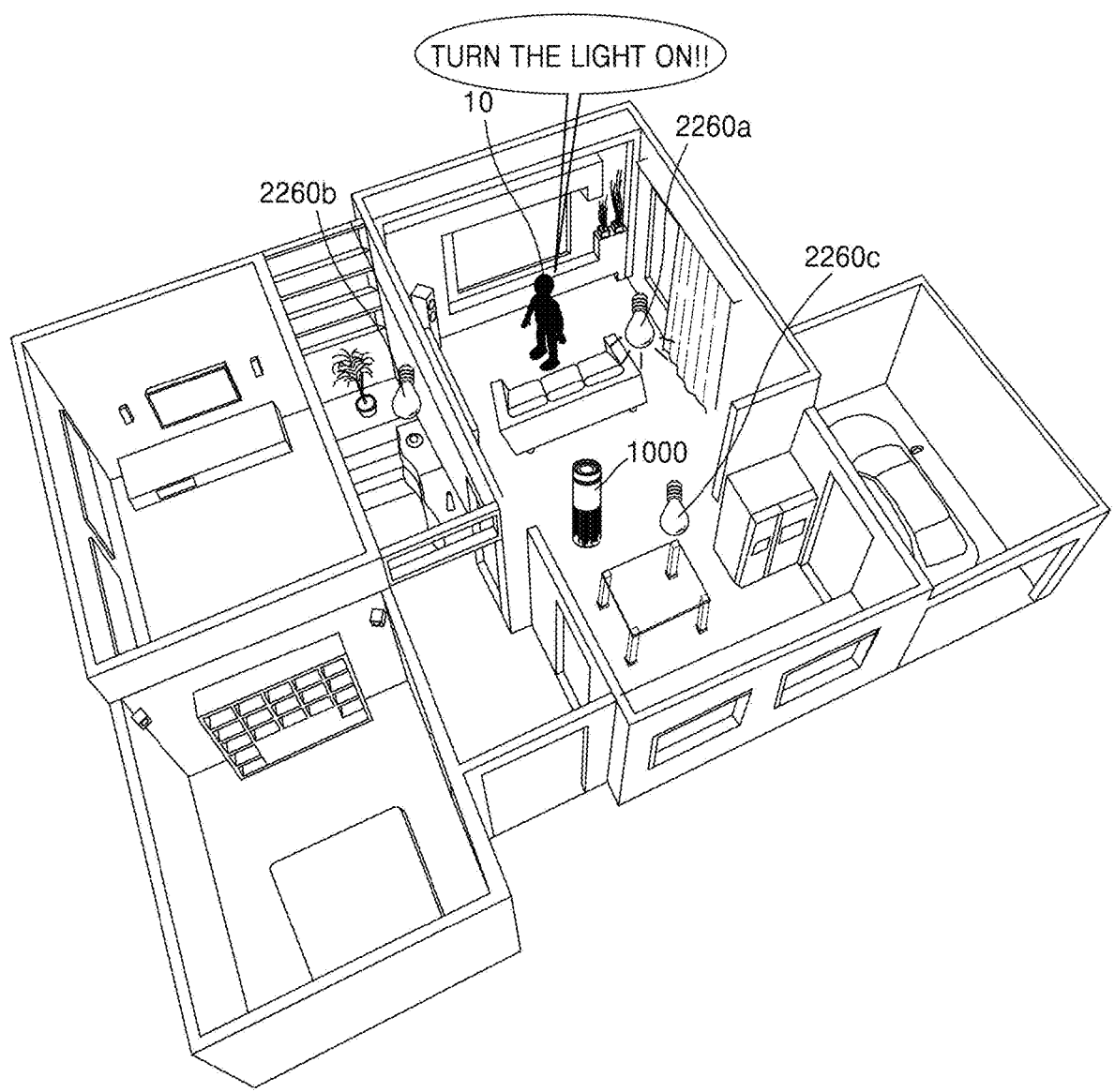
FIG. 22 is a diagram showing a method by which a device selects a device to control based on a direction of a speech signal, according to an embodiment of the disclosure.

FIG. 22 is a diagram showing a method by which a device selects a device to control based on the direction of a speech signal, according to various embodiments of the disclosure.

The device 1000 may store location information in correspondence to a first direction. For example, as a speech signal "register here as kitchen" is received, the device 1000 may store identification information of a kitchen in correspondence to the direction of the speech signal. Also, for example, as a speech signal "turn the light on in the kitchen" is received, the device 1000 may store identification information of the kitchen in correspondence to the direction of the speech signal.

Referring to FIG. 22, the device 1000 may select an electric lamp to control from among a plurality of electric lamps inside a house based on the direction of a speech signal. For example, when a speech signal "turn the light on" is received from a user located at the kitchen, the device 1000 may obtain identification information of the kitchen as location information corresponding to the direction of the received speech signal. The device 1000 may turn on an electric lamp 2260c located at the kitchen from among a plurality of electric lamps 2260a, 2260b, and 2260c, based on the identification information of the kitchen.

Also, the device 1000 may select a TV to control from among a plurality of TVs inside a house based on the direction of a speech signal. For example, when a speech signal "show me news" is received from a user located at the kitchen, the device 1000 may obtain identification information of the kitchen as location information corresponding to the direction of the received speech signal and control a TV located at the kitchen to provide a news program.

FIG. 23 is a diagram showing a method by which a device stores a home device or location information in correspondence to direction ranges, according to various embodiments of the disclosure.

Referring to FIG. 23, the device 1000 may store identification information or location information of the home device 2000 in correspondence to identification information of direction ranges.

Figure 24:
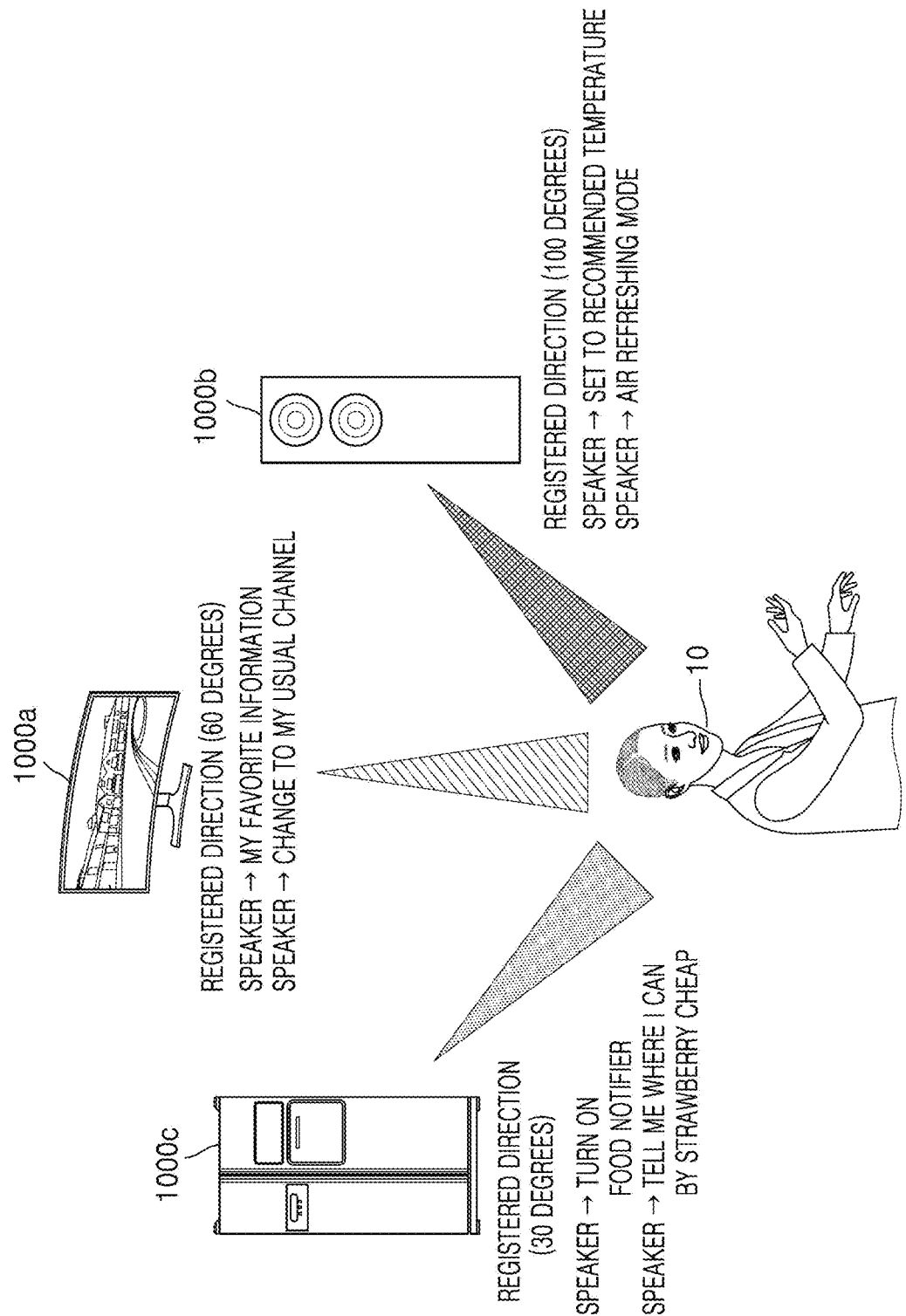
FIG. 24 is a diagram showing a method by which a plurality of devices located from one another within a reference distance set registered directions, according to an embodiment of the disclosure.

FIG. 24 is a diagram showing a method by which a plurality of devices located from one another within a reference distance set registered directions, according to various embodiments of the disclosure.

Referring to FIG. 24, a plurality of devices including a TV 1000a, an air conditioner 1000b, and a refrigerator 1000c may be located from one another within a reference distance.

For example, each of the refrigerator 1000c, the TV 1000a, and the air conditioner 1000b may be the device 1000 capable of recognizing speech.

When the plurality of devices including the TV 1000a, the air conditioner 1000b, and the refrigerator 1000c are located from one another within the reference distance, registered directions may overlap. For example, one location in a house may be a registered direction for all of the refrigerator 1000c, the TV 1000a, and the air conditioner 1000b. Accordingly, a speech signal of a user may be simultaneously transmitted to the plurality of devices including the TV 1000a, the air conditioner 1000b, and the refrigerator 1000c and all of the plurality of devices including the TV 1000a, the air conditioner 1000b, and the refrigerator 1000c may provide speech recognition services based on the same speech signal.

Accordingly, when one location in a house is in a registered direction to one device, a registered direction and a shading direction may be set to each of the plurality of devices including the TV 1000a, the air conditioner 1000b, and the refrigerator 1000c, such that the location is in the shading directions of the other devices.

For example, when a user transmits a speech signal to set a registered direction for the refrigerator 1000c, the refrigerator 1000c may set the direction of the speech signal as the registered direction, whereas the TV 1000a and the air conditioner 1000b, which have received the same speech signal, may set the direction of the speech signal as shading directions.

Figure 25:
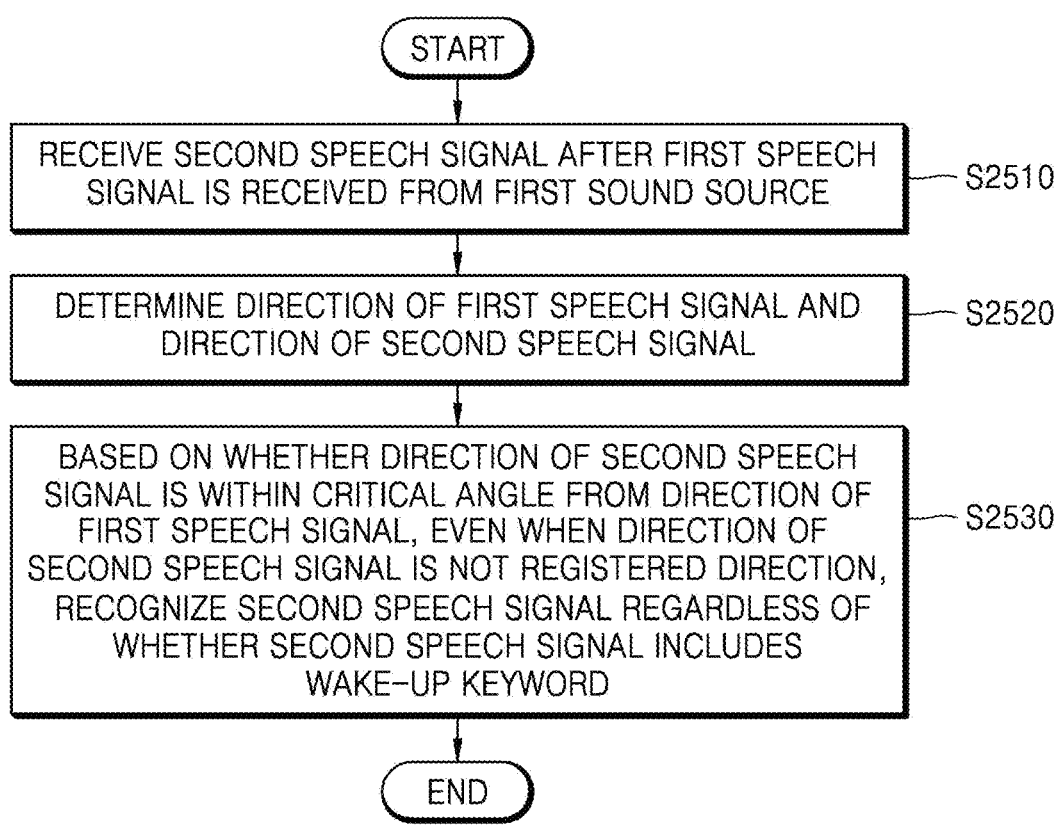
FIG. 25 is a flowchart of a method by which a device provides a speech recognition service in consideration of a moving path of a sound source, according to an embodiment of the disclosure.

FIG. 25 is a flowchart of a method by which a device provides a speech recognition service in consideration of a moving path of a sound source, according to various embodiments of the disclosure.

Referring to FIG. 25, in operation S2510, the device 1000 may receive a first speech signal from a first sound source and then receive a second speech signal. In operation S2520, the device 1000 may determine the direction of the first speech signal and the direction of the second speech signal. Operations S2510 and S2520 may be described with reference to operations S510 and S520 of FIG. 5.

The device 1000 may determine that the direction of the first speech signal is in a registered direction. Accordingly, the device 1000 may provide a speech recognition service based on the first speech signal, regardless of whether the first speech signal includes a wake-up keyword.

Furthermore, as the first speech signal is received from the first sound source, the device 1000 may detect the characteristics of the first speech signal.

In operation S2530, based on whether the direction of the second speech signal is within a critical angle from the direction of the first speech signal, even when the direction of the second speech signal is not a registered direction, the device 1000 may recognize the second speech signal regardless of whether the second speech signal includes a wake-up keyword.

The device 1000 may determine whether the direction of the second speech signal is within a critical angle from the direction of the first speech signal. For example, the device 1000 may determine a variation of the first sound source based on the angle between the direction of the first speech signal and the direction of the second speech signal and determine whether the determined variation is within a critical angle. As it is determined that the direction of the second speech signal is within a critical angle from the direction of the first speech signal, the device 1000 may recognize the second speech signal regardless of whether the second speech signal includes a wake-up keyword.

Also, according to embodiments, as it is determined that the direction of the second speech signal is not a registered direction, the device 1000 may determine whether the second speech signal is received within a reference amount of time after the first speech signal is received from the first sound source.

When the second speech signal is received within the reference amount of time, the device 1000 may detect the characteristics of the second speech signal, compare the detected characteristics with the characteristics of the first speech signal, and determine whether the sound source of the second speech signal is the first sound source.

As it is determined that the second speech signal is received from the first sound source, the device 1000 may determine whether the direction of the second speech signal is within a critical angle from the direction of the first speech signal.

When it is determined that the direction of the second speech signal is within the critical angle from the direction of the first speech signal, even when it is determined that the direction of the second speech signal is not a registered direction, the device 1000 may provide a speech recognition service regardless of whether a wake-up keyword is received.

Also, although FIG. 25 exemplified a case where the second speech signal is received separately from the first speech signal, according to embodiments, even when a user moves from a registered direction to a non-registered direction while speaking one sentence, the device 1000 may provide a speech recognition service based on the spoken sentence regardless of whether a wake-up keyword is received.

Furthermore, when it is determined that the sound source of the second speech signal is the first sound source, the device 1000 may determine that the first sound source has moved from the direction of the first speech signal to the direction of the second speech signal during a reference amount of time.

Furthermore, according to embodiments, when the device 1000 determines a three-dimensional position of a sound source, it may be determined that the first sound source has moved from a location calculated from the first speech signal to a location calculated from the second speech signal during the reference amount of time.

Figure 26:
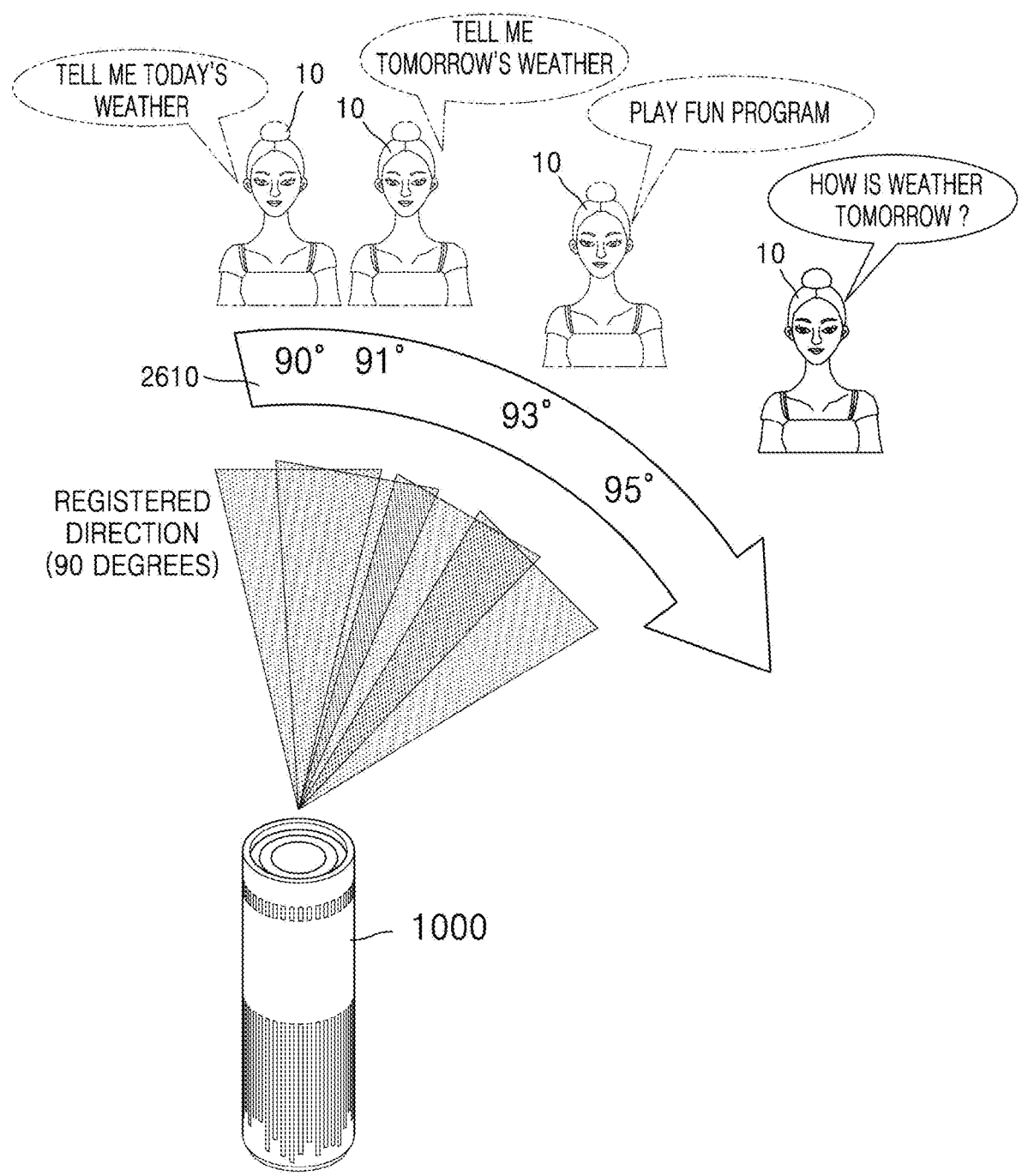
FIG. 26 is a diagram showing a method by which a device provides a speech recognition service in consideration of a moving path of a sound source, according to an embodiment of the disclosure.

FIG. 26 is a diagram showing a method by which a device provides a speech recognition service in consideration of a moving path of a sound source, according to various embodiments of the disclosure.

Referring to FIG. 26, the device 1000 may consider a moving path of a sound source and, even when the direction of a sound signal is not a registered direction, may provide a speech recognition service regardless of whether a wake-up keyword is received.

For example, in the device 1000, directions corresponding to angles from 60 degrees to 90 degrees may be set as registered directions, and directions corresponding to angles from 90 degrees to 120 degrees may not be set as registered directions. The sound source 10 (e.g., a user) may transmit a speech signal to the device 1000 without a wake-up keyword while moving from the direction corresponding to 90 degrees to the direction corresponding to 95 degrees.

When the sound source 10 is located at the direction corresponding to 95 degrees, even when it is determined that the direction of a speech signal is not a registered direction and the speech signal does not include a wake-up keyword, when the speech signal is received from a same sound source within a reference amount of time from a time at which a previous speech signal has been received, the device 1000 may provide a speech recognition service based on the received speech signal.

Figure 27:
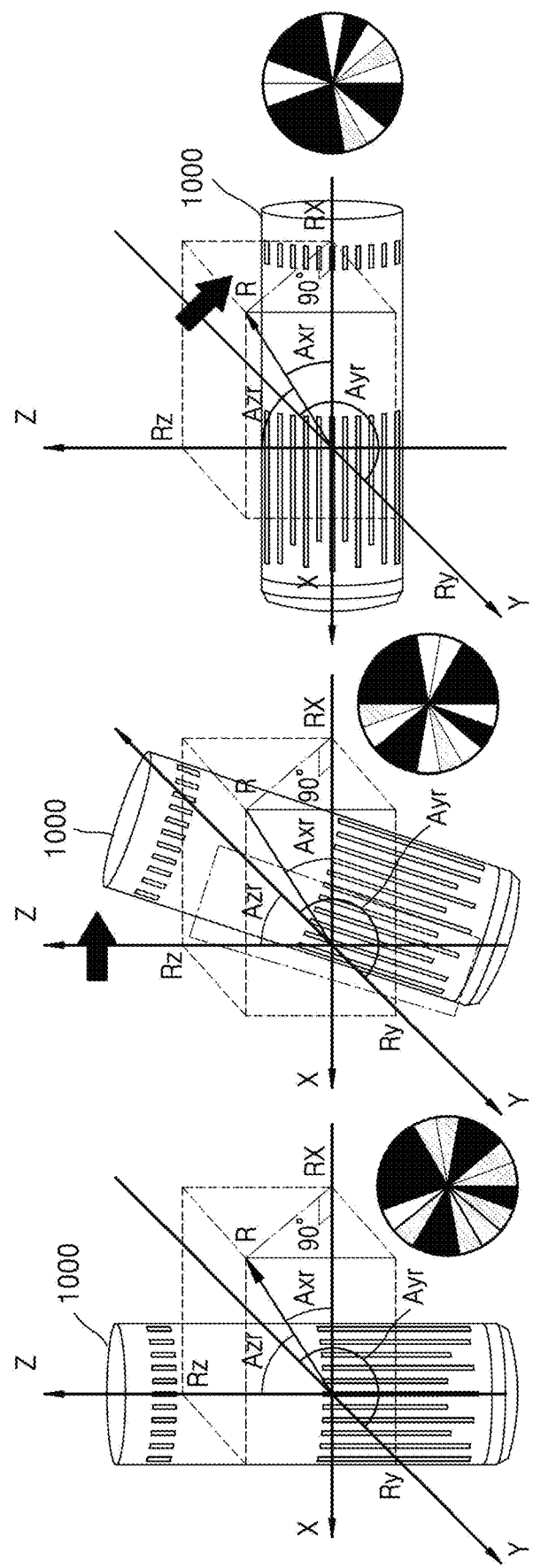
FIG. 27 is a diagram showing a method by which a device changes a registered direction based on a direction or a degree of tilt of the device, according to an embodiment of the disclosure.

FIG. 27 is a diagram showing a method by which a device changes a registered direction based on a direction or a degree of tilt of the device, according to various embodiments of the disclosure.

Referring to FIG. 27, the device 1000 may determine a registered direction based on three-dimensional coordinates.

As the device 1000 is tilted or rotated, the device 1000 may change the registered direction.

For example, the device 1000 may calculate a rotation angle, a tilting direction, and a tilting angle of the device 1000 by using a positional sensor in the device 1000. The device 1000 may change the registered direction based on the rotation angle, the tilting direction, the tilting angle, and pre-set three-dimensional coordinates.

Also, even when the device 1000 is moved by a user, the device 1000 may automatically correct or change a previously registered direction through location sensing or learning.

Figure 28:
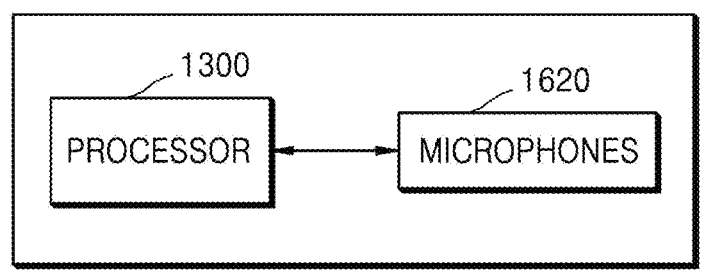
FIGS. 28 and 29 are block diagrams of a device according to various embodiments of the disclosure.
Figure 29:
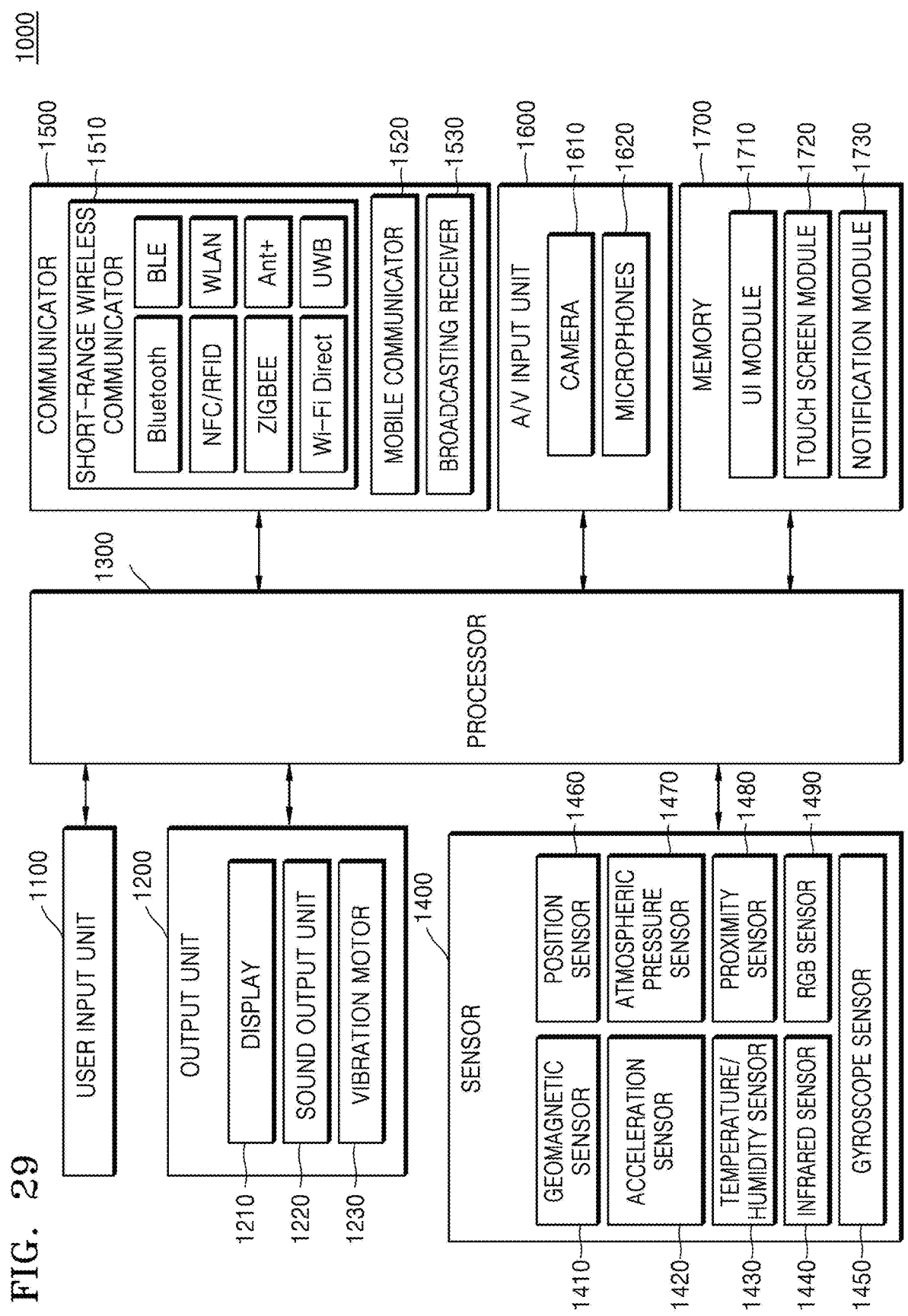

FIGS. 28 and 29 are block diagrams of a device according to various embodiments of the disclosure.

Referring to FIG. 28, the device 1000, according to various embodiments, may include the plurality of microphones 1620 and a processor 1300. However, not all of the components shown in FIG. 28 are essential components of the device 1000. The device 1000 may be implemented by components less than or more than the components shown in FIG. 28. For example, the device may include a plurality of processors and the operations performed by the processor 1300 may be operated by the plurality of processors.

Referring to FIG. 29, for example, the device 1000, according to various embodiments, may include a user input unit 1100, the display 1210, an output unit 1200, a communicator 1500, a sensor 1400, an audio/video (A/V) input unit 1600, and a memory 1700 other than the plurality of microphones 1620 and the processor 1300.

The user input unit 1100 refers to a unit by which a user inputs data for controlling the device 1000. For example, the user input unit 1100 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch. Also, the user input unit 1100 may be connected to the plurality of microphones 1620 and receive a speech input for controlling the device 1000.

The output unit 1200 may output an audio signal, a video signal, or a vibration signal, and may include the display 1210, a sound output unit 1220, and a vibration motor 1230.

The display 1210 displays and outputs information processed in the device 1000. For example, the display 1210 may display an image indicating a registered direction set to the device 1000.

Meanwhile, when the display 1210 and a touch pad form a mutual layer structure and then are formed as a touch screen, the display interface may be used as both an output device and input device. The display 1210 may include at least one of liquid crystal display (LCD), a thin film transistor-liquid crystal display (TFT-LCD), an organic light-emitting diode (OLED) display, a flexible display, a three-dimensional (3D) display, and an electrophoretic display.

The display 1210 may also include a light-emitting device (not shown). The light-emitting device (not shown) may include, for example, a light emitting diode and a display panel, but is not limited thereto.

The sound output unit 1220 outputs sound data received from the communicator 1500 or stored in the memory 1700. The vibration motor 1230 may output a vibration signal.

The processor 1300 generally controls all operations of the device 1000. For example, the processor 1300 may generally control the user input unit 1100, the output unit 1200, the sensor 1400, the communicator 1500, and the A/V input unit 1600 by executing programs stored in the memory 1700. The processor 1300 may control the operation of the device 1000 to perform the functions of the device 1000 shown in FIGS. 1 to 27.

In detail, based on a received sound signal, the processor 1300 may determines a direction from a speech recognition device to a first sound source, determine whether the direction to the first sound source is in a registered direction, and, based on whether the direction to the first sound source is in a registered direction, provide a speech recognition service regardless of whether the sound signal includes a wake-up keyword.

Furthermore, the processor 1300 may control a light-emitting device corresponding to a registered direction from among a plurality of light-emitting devices to emit light differently from the remaining light-emitting devices.

Furthermore, as a user input for touching a touch element corresponding to a first direction from among a plurality of touch elements is received, the processor 1300 may determine the first direction as the registered direction.

Furthermore, based on a plurality of sound signals received from a plurality of directions, the processor 1300 may determine a frequency that a wake-up keyword is received respectively in correspondence to the plurality of directions and determine a direction corresponding to a determined frequency equal to or higher than a critical value from among the plurality of directions as a registered direction.

Also, the processor 1300 may determine whether the direction of a sound signal is a shading direction and, when the direction of a sound signal is a shading direction, may not recognize the sound signal.

Furthermore, based on a plurality of sound signals received from a plurality of directions, the processor 1300 may determine whether a noise signal is received in each of the plurality of directions and determine a direction in which noise signals are received for a reference amount of time or longer as a shading direction.

Furthermore, the processor 1300 may determine a time period during which noise signals are received for a reference amount of time or longer and may determine a direction in which noise signals are received as a shading direction in correspondence to the time period.

Furthermore, when the priority corresponding to the direction to the first sound source is higher than the priority corresponding to the direction to the third sound source, the processor 1300 may provide a speech recognition service based on the sound signal received from the first sound source.

Also, the processor 1300 may determine a speech recognition service related to a sound signal received from a sound source located in a registered direction based on identification information of the home device corresponding to the registered direction.

Furthermore, when the direction of a first sound signal is in a registered direction and a second sound signal is received after the first sound signal is received, the processor 1300 may provide a speech recognition service based on the second sound signal regardless of whether the second sound signal includes a wake-up keyword and the direction of the second sound signal is in a registered direction, based on whether the second sound signal is received from a same sound source within a reference amount of time after the first sound signal is received.

The sensor 1400 may sense a state of the device 1000 or a status around the device 1000 and may transfer sensed information to the processor 1300.

Furthermore, the processor 1300 may control the communicator 1500 to transmit an image-processed image to another device connected to the device 1000.

The sensor 1400 may include, but is not limited to, at least one of a geomagnetic sensor 1410, an acceleration sensor 1420, a temperature/humidity sensor 1430, an infrared sensor 1440, a gyroscope sensor 1450, a position sensor (e.g., a global positioning system (GPS)) 1460, an atmospheric pressure sensor 1470, a proximity sensor 1480, a red, green and blue (RGB) sensor 1490, and an illuminance sensor (not shown). Functions of the sensors may be intuitively deduced by one of ordinary skill in the art by referring to names of the sensors, and thus, detailed descriptions thereof are omitted here.

The communicator 1500 may include one or more components that enables the device 1000 to communicate with an external device. For example, the communicator 1500 may include a short range wireless communicator 1510, a mobile communicator 1520, and a broadcasting receiver 1530.

The short range wireless communicator 1510 may include, but is not limited to, a Bluetooth communication interface, a bluetooth low energy (BLE) communication interface, a near field communication interface, a wireless local area network (WLAN) communication interface, a Zigbee communication interface, an infrared data association (IrDA) communication interface, a Wi-Fi direct (WFD) communication interface, an ultra wideband (UWB) communication interface, and an Ant+ communication interface.

The mobile communicator 1520 exchanges a wireless signal with at least one of a base station, an external terminal, and a server on a mobile communication network. Here, the wireless signal may include a voice call signal, a video call signal, or various types of data associated with transmission and reception of text/multimedia messages.

The broadcasting receiver 1530 receives a broadcast signal and/or information related to a broadcast from the outside through a broadcast channel. The broadcast channel may include a satellite channel and a ground wave channel. In another embodiment, the device 1000 may not include the broadcasting receiver 1530.

The A/V input unit 1600 may receive an input of an audio signal or a video signal and may include a camera 1610 and the plurality of microphones 1620.

The memory 1700 may store a program for processing and controlling the processor 1300, and may store data input to the device 1000 or output from the device 1000.

The memory 1700 according to an embodiment may include at least one type of storage medium from among a flash memory type, a hard disk type, a multimedia card micro type, a card type memory (e.g., a secure digital (SD) memory or an extreme digital (XD) memory), a random access memory (RAM), a static random access memory (SRAM), a read only memory (ROM), an electrically erasable programmable read-only memory (EEPROM), a programmable read-only memory (PROM), a magnetic memory, a magnetic disk, and an optical disc.

Programs stored in the memory 1700 may be classified into a plurality of modules according to their functions, e.g., a user interface (UI) module 1710, a touch screen module 1720, a notification module 1730, an image filter module 1740, etc.

The memory 1700 may store a registered direction, a shading direction, information about the home device 2000, information about priorities, and location information.

The UI module 1710 may provide a specialized UI or graphical user interface (GUI) associated with the device 1000 for each application. The touch screen module 1720 may detect a user's touch gesture on the touch screen and transmit information related to the touch gesture to the processor 1300. The touch screen module 1720 according to various embodiments may recognize and analyze a touch code. The touch screen module 1720 may be embodied as separate hardware including a controller.

The mobile device 5000 may also include the device configurations shown in FIGS. 28 and 29.

Figure 30:
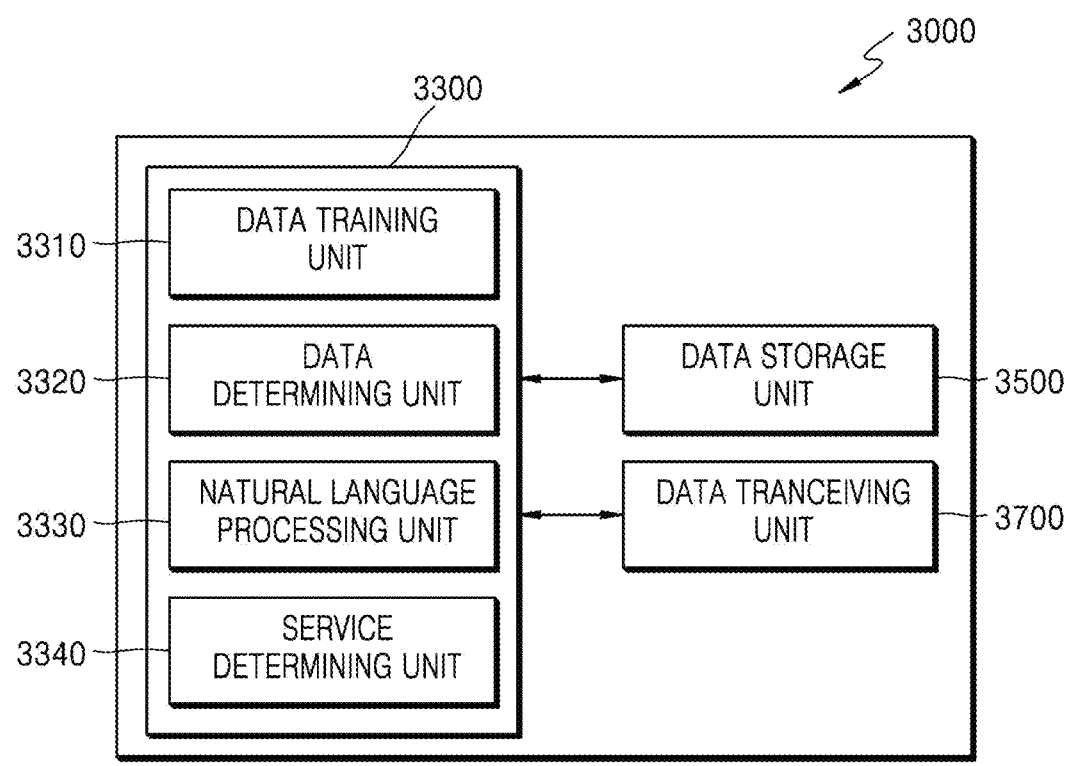
FIG. 30 is a block diagram of an AI server according to an embodiment of the disclosure.

FIG. 30 is a block diagram of an AI server according to various embodiments of the disclosure.

Referring to FIG. 30, the AI server 3000 may include a controller 3300, a data storage unit 3500, and a data transceiving unit 3700.

The data transceiving unit 3700 may include at least one component that enables the AI server 3000 to communicate with an external device. For example, the data transceiving unit 3700 may include a short range wireless communicator, a mobile communicator, and a broadcasting receiver, and may be described with reference to the device configuration of FIG. 29 indicated with the same names.

The data transceiving unit 3700 may receive speech data of a user, user information, and sensor data from the device 1000 or the mobile device 5000 and may transmit information about a speech recognition service to provide to the device 1000 or the mobile device 5000.

The data storage unit 3500 may store a program for processing and controlling of the controller 3300 and may store data input to or output from the AI server 3000.

The data storage unit 3500 according to an embodiment may include at least one type of storage medium from among a flash memory type, a hard disk type, a multimedia card micro type, a card type memory (e.g., an SD memory or an XD memory), a random access memory (RAM), a static random access memory (SRAM), a read only memory (ROM), an electrically erasable programmable read-only memory (EEPROM), a programmable read-only memory (PROM), a magnetic memory, a magnetic disk, and an optical disc.

The data storage unit 3500 may store identification information of a user, identification information of the device 1000, a registered direction, a shading direction, information about the home device 2000, information about priorities, and location information.

The controller 3300 generally controls the overall operation of the AI server 3000. For example, the controller 3300 may generally control the data storage unit 3500 and the data transceiving unit 3700 by executing programs stored in the data storage unit 3500. The controller 3300 may control the operation of the AI server 3000 to perform the functions described with reference to FIGS. 1 to 27. Furthermore, the controller 3300 may include a plurality of processors.

The controller 3300 may determine a speech recognition service based on speech data of a user, user information, and sensor data.

The controller 3300 may include a data training unit 3310, a data determining unit 3320, a natural language processing unit 3330, and a speech recognition service determining unit 3340.

The natural language processing unit 3330 may detect an intention of a user from words or a sentence received from the device 1000 or the mobile device 5000.

The speech recognition service determining unit 3340 may determine a speech recognition service to be provided to the user based on the information received from the device 1000 or the mobile device 5000 and the intention of the user and collect information according to the determined speech recognition service.

The data training unit 3310 may train criteria for determining situations. The data training unit 3310 may train criteria related to what data is to be used to determine a certain situation and how the situation needs to be determined. The data training unit 3310 may obtain data to be used for training and apply the obtained data to a data determination model described below, thereby training criteria for determining situations. A determination of a situation may be a determination of whether to set or unregister a registered direction and may be a determination of whether to set or unregister a shading direction.

The data determining unit 3320 may determine a situation based on data. The data determining unit 3320 may recognize a situation from certain data by using a trained data determination model. The data determining unit 3320 may obtain certain data according to pre-set criteria based on training and utilize a data determination model by using the obtained data as input values, thereby determining a certain situation based on the certain data. Furthermore, a result value output by the data determination model by using the obtained data as input values may be used to modify and refine the data determination model. The data may include set values pre-set in a direction range in which a speech signal is received and a frequency that a speech recognition service has been requested in the direction range in which the speech signal is received. Here, a result value output by the data determination model may be one of a registered direction, a general direction, and a shading direction. Furthermore, the data may include a time at which a sound signal is received, the characteristics of the sound signal, and whether the sound signal is a request for a speech recognition service, and a result value output by the data determination model may be a value for setting or unregistering a shading direction.

At least one of the data training unit 3310 and the data determining unit 3320 may be fabricated in the form of at least one hardware chip and mounted on an electronic device. For example, at least one of the data training unit 3310 and the data determining unit 3320 may be fabricated in the form of a dedicated hardware chip for AI or may be fabricated as a part of a known general-purpose processor (e.g., a CPU or an application processor) or a graphics-only processor (e.g., a GPU) and may be mounted on the various electronic devices as described above.

In this case, the data training unit 3310 and the data determining unit 3320 may be mounted on one electronic device or may be mounted respectively on separate electronic devices. For example, one of the data training unit 3310 and the data determining unit 3320 may be included in an electronic device, and the other one may be included in a server. Also, the data training unit 3310 and the data determining unit 3320 may provide information about a model established by the data training unit 3310 to the data determining unit 3320 via a wire or a wireless network or data input to the data determining unit 3320 may be provided to the data training unit 3310 as additional training data.

Meanwhile, at least one of the data training unit 3310 and the data determining unit 3320 may be implemented as a software module. When at least one of the data training unit 3310 and the data determining unit 3320 is implemented as a software module (or a program module including instructions), the software module may be stored in a non-transitory computer-readable medium. Furthermore, in this case, at least one software module may be provided by an operating system (OS) or by a certain application. Alternatively, some of the at least one software module may be provided by the OS, and the other software modules may be provided by a certain application.

One or more embodiments may be implemented by a computer-readable recording medium including computer-executable instructions such as a program module executed by a computer. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically include a computer-readable instruction, a data structure, a program module, other data of a modulated data signal, or another transmission mechanism, and an example thereof includes an arbitrary information transmission medium.

Also, in this specification, a "unit" may be a hardware component, such as a processor or a circuit, and/or a software component executed by a hardware component like a processor.

It will be understood by one of ordinary skill in the art that various changes in form and details may be made therein without departing from the spirit and scope of the disclosure as defined by the following claims. It is therefore to be understood that the above-described embodiments are merely illustrative in all aspects and not restrictive. For example, each component described as a single entity may be distributed and implemented, and components described as being distributed may also be implemented in a combined form.

It should be understood that the description should only be considered in a descriptive sense. Descriptions of features or aspects within each embodiment are generally considered to be available for other similar features or aspects in other embodiments.

While the disclosure has been shown and described with reference to various embodiments thereof, it will be understood by those skilled in the art that various changes are in the form and details may be made therein without departing from the spirit and scope of the disclosure as defined by the appended claims and their equivalents.

What is claimed is:

1. A speech recognition device comprising:
   at least one microphone configured to receive a sound signal from a first sound source; and
   at least one processor configured to:
   determine a direction of the first sound source based on the sound signal,
   determine whether the direction of the first sound source is in a registered direction, and
   based on whether the direction of the first sound source is in the registered direction, recognize a speech from the sound signal regardless of whether the sound signal comprises a wake-up keyword as a part of the sound signal,
   wherein the at least one processor is further configured to:
   based on a plurality of sound signals received from a plurality of directions, determine a frequency that a speech recognition service is requested, respectively, in correspondence to the plurality of directions, and
   determine a direction, which corresponds to a determined frequency equal to or greater than a critical value from among the plurality of directions, as the registered direction.

2. The speech recognition device of claim 1,
   wherein the sound signal requesting a speech recognition service comprises a sound signal including a wake-up keyword,
   wherein the wake-up keyword comprises at least one keyword to request a speech recognition service from the speech recognition device based on a speech signal following the wake-up keyword, and
   wherein the wake-up keyword comprises at least one of a human speech and a non-speech sound.

3. The speech recognition device of claim 1, wherein the at least one processor is further configured to:
   determine whether a noise signal is received based on the plurality of sound signals received from the plurality of directions, and
   determine a direction, in which the noise signal is received for a reference amount of time or longer from among the plurality of directions, as a shading direction.

4. The speech recognition device of claim 3, wherein the at least one processor is further configured to:
   determine a time period during which the noise signal is received for the reference amount of time or longer, and
   determine a direction, in which the noise signal is received, as the shading direction in correspondence to the time period.

5. The speech recognition device of claim 1, wherein the at least one processor is further configured to determine whether the direction of the first sound source is in the registered direction by determining whether the direction of the first sound source is within a critical angle from the registered direction.

6. The speech recognition device of claim 5, wherein the at least one processor is further configured to:
   determine a variation of the direction of the first sound source, and
   determine whether the variation is within the critical angle to determine whether the direction of the first sound source is within the critical angle from the registered direction.

7. The speech recognition device of claim 1, further comprising:
   a storage configured to store information about a device located in the registered direction,
   wherein the at least one processor is further configured to, when the direction of the first sound source is in the registered direction, provide a result of speech recognition based on the information about the device corresponding to the registered direction.

8. The speech recognition device of claim 1, further comprising:
   a plurality of light-emitting devices configured to indicate a plurality of directions,
   wherein the at least one processor is further configured to control a light-emitting device corresponding to the registered direction from among the plurality of light-emitting devices to emit light differently from remaining light-emitting devices of the plurality of light-emitting devices.

9. The speech recognition device of claim 1, further comprising:
   an interface including a plurality of touch elements corresponding to a plurality of directions,
   wherein the at least one processor is further configured to determine a first direction as the registered direction corresponding to receiving a user input for touching a touch element corresponding to the first direction from among the plurality of touch elements.

10. The speech recognition device of claim 1,
wherein the at least one microphone is further configured to receive a first speech signal output from a first user and a second speech signal output from a second user different from the first user, and
wherein the at least one processor is further configured to, when a priority corresponding to a direction to the first user is higher than a priority corresponding to a direction to the second user, recognize only the first speech signal output from the first user while excluding the second speech signal output from the second user.

11. A speech recognition method, the method comprising:
receiving a sound signal from a first sound source;
determining a direction of the first sound source based on the sound signal;
determining whether the direction of the first sound source is in a registered direction; and
recognizing a speech from the sound signal regardless of whether the sound signal comprises a wake-up keyword as a part of the sound signal, based on whether the direction of the first sound source is in the registered direction,
wherein the method further comprises:
based on a plurality of sound signals received from a plurality of directions, determining a frequency that a speech recognition service is requested, respectively, in correspondence to the plurality of directions; and
determining a direction, which corresponds to a determined frequency equal to or greater than a critical value from among the plurality of directions, as the registered direction.

12. The method of claim 11,
wherein the sound signal requesting a speech recognition service comprises a sound signal including a wake-up keyword,
wherein the wake-up keyword comprises at least one keyword to request a speech recognition service from a speech recognition device based on a speech signal following the wake-up keyword, and
wherein the wake-up keyword comprises at least one of a human speech and a non-speech sound.

13. The method of claim 11, further comprising:
determining whether a noise signal is received based on the plurality of sound signals received from the plurality of directions; and
determining a direction, in which the noise signal is received for a reference amount of time or longer from among the plurality of directions, as a shading direction.

14. The method of claim 13, further comprising:
determining a time period during which the noise signal is received for the reference amount of time or longer; and
determining a direction, in which the noise signal is received, as the shading direction in correspondence to the time period.

15. The method of claim 11, wherein the determining of whether the direction of the first sound source is in the registered direction comprises determining whether the direction of the first sound source is within a critical angle from the registered direction.

16. The method of claim 15, wherein the determining of whether the direction of the first sound source is within the critical angle from the registered direction comprises:
determining a variation of the direction of the first sound source; and
determining whether the determined variation is within the critical angle.

17. The method of claim 11, further comprising:
storing information about a device located in the registered direction; and
when the direction of the first sound source is in the registered direction, providing a result of speech recognition based on the information about the device corresponding to the registered direction.

18. The method of claim 11, further comprising controlling a light-emitting device corresponding to the registered direction from among a plurality of light-emitting devices to emit light differently from the remaining light-emitting devices.

19. The method of claim 11, further comprising determining a first direction as the registered direction corresponding to receiving user input for touching a touch element corresponding to the first direction from among a plurality of touch elements.

20. The method of claim 11,
wherein the receiving of the sound signal from the first sound source comprises receiving a first speech signal output from a first user and a second speech signal output from a second user different from the first user, and
wherein the recognizing of the speech comprises, when a priority corresponding to a direction to the first user is higher than a priority corresponding to a direction to the second user, recognizing only the first speech signal output from the first user while excluding the second speech signal output from the second user.

21. The method of claim 11, wherein the registered direction is a direction input by voice indicating a direction relative to a speech recognition device.

* * * * *